(12) United States Patent
Feng

(10) Patent No.: US 10,397,542 B2
(45) Date of Patent: Aug. 27, 2019

(54) FACILITATING QUANTIZATION AND COMPRESSION OF THREE-DIMENSIONAL GRAPHICS DATA USING SCREEN SPACE METRICS AT COMPUTING DEVICES

(71) Applicant: INTEL CORPORATION, Santa Clara, CA (US)

(72) Inventor: Louis Feng, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 185 days.

(21) Appl. No.: 15/488,742

(22) Filed: Apr. 17, 2017

(65) Prior Publication Data
US 2017/0223335 A1    Aug. 3, 2017

Related U.S. Application Data

(63) Continuation of application No. 14/858,305, filed on Sep. 18, 2015, now Pat. No. 9,716,875.

(51) Int. Cl.
| | |
|---|---|
| *H04N 13/161* | (2018.01) |
| *H04N 19/124* | (2014.01) |
| *H04N 19/597* | (2014.01) |
| *H04N 19/154* | (2014.01) |
| *H04N 19/17* | (2014.01) |
| *H04N 19/20* | (2014.01) |

(Continued)

(52) U.S. Cl.
CPC ............. *H04N 13/161* (2018.05); *G06T 7/70* (2017.01); *H04N 19/124* (2014.11);
(Continued)

(58) Field of Classification Search
CPC ...... G06T 7/70; H04N 13/161; H04N 19/124; H04N 19/13; H04N 19/17; H04N 19/20; H04N 19/136; H04N 19/597
(Continued)

(56) References Cited

U.S. PATENT DOCUMENTS

| | | |
|---|---|---|
| 6,262,737 B1 | 7/2001 | Li |
| 6,573,890 B1 | 6/2003 | Lengyel |

(Continued)

FOREIGN PATENT DOCUMENTS

| | | |
|---|---|---|
| KR | 10-2012-0118622 | 10/2012 |
| KR | 1020120118622 | 10/2012 |

OTHER PUBLICATIONS

PCT Application No. PCT/US2016/043343, Notification Concerning Transmittal of International Preliminary Report on Patentability, dated Mar. 29, 2018, 4 pgs.

(Continued)

*Primary Examiner* — Daniel G Mariam
(74) *Attorney, Agent, or Firm* — Womble Bond Dickinson (US) LLP

(57) ABSTRACT

A mechanism is described for facilitating quantization and compression of three-dimensional graphics data using screen space metrics at computing devices. A method of embodiments, as described herein, includes detecting one or more sets of data comprising at least one of camera data, output format data, and geometry data, and obtaining geometry of a three-dimensional (3D) original object based on the geometry data. The method may further include computing, in camera space, visual quality of the 3D original object when moved closer to or farther away from a camera based on at least one of the camera data and the output format data, and computing a metric based on the visual quality. The method may further include compressing the 3D original object into a 3D quantized object based on the metric.

24 Claims, 19 Drawing Sheets

(51) Int. Cl.
*H04N 19/13* (2014.01)
*H04N 19/136* (2014.01)
*G06T 7/70* (2017.01)

(52) U.S. Cl.
CPC .......... *H04N 19/13* (2014.11); *H04N 19/136* (2014.11); *H04N 19/154* (2014.11); *H04N 19/17* (2014.11); *H04N 19/20* (2014.11); *H04N 19/597* (2014.11)

(58) Field of Classification Search
USPC ................................................ 382/154, 232
See application file for complete search history.

(56) References Cited

U.S. PATENT DOCUMENTS

| | | | |
|---|---|---|---|
| 8,331,435 B2 * | 12/2012 | Inoue | H04N 19/61 345/419 |
| 8,462,149 B2 | 6/2013 | Lee | |
| 8,670,483 B2 * | 3/2014 | Morphet | H04N 5/145 375/240.16 |
| 2009/0080516 A1 | 3/2009 | Chang | |
| 2009/0161989 A1 | 6/2009 | Sim | |
| 2012/0140036 A1 | 6/2012 | Maruyama | |
| 2013/0058584 A1 | 3/2013 | Shimizu et al. | |
| 2014/0002452 A1 | 1/2014 | Levin et al. | |
| 2016/0234496 A1 * | 8/2016 | Panda | H04N 19/124 |

OTHER PUBLICATIONS

PCT/US2016/043343 Notification of Transmittal and the International Search Report and the Written Opinion of the International Searching Authority, or the Declaration, 10 pages, dated Oct. 24, 2016.

* cited by examiner

US 10,397,542 B2

FACILITATING QUANTIZATION AND COMPRESSION OF THREE-DIMENSIONAL GRAPHICS DATA USING SCREEN SPACE METRICS AT COMPUTING DEVICES

This application is a continuation of co-pending U.S. application Ser. No. 14/858,305 filed on Sep. 18, 2015, which is incorporated herein by reference in its entirety.

FIELD

Embodiments described herein generally relate to computers. More particularly, embodiments for facilitating quantization and compression of three-dimensional (3D) graphics data using screen space metrics at computing devices.

BACKGROUND

Data compression is essential for many software applications, ranging from communication applications to analytic applications. In particular, in computer graphics and visualization domain, conventional data compression techniques are faced with a range of data complexities as visual media continues to grow. For example, today's feature animated film is capable of generating over 250 terabyte (TB) of data in the process, where each screen shot may include hundreds of millions to billions of polygon and curve (hair) primitives in additional to tens of gigabytes (GBs) of textures. Conventional compression techniques are incapable of handling data of such complexity, which leads to inconsistency, inefficiency, and severe loss of visual quality.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
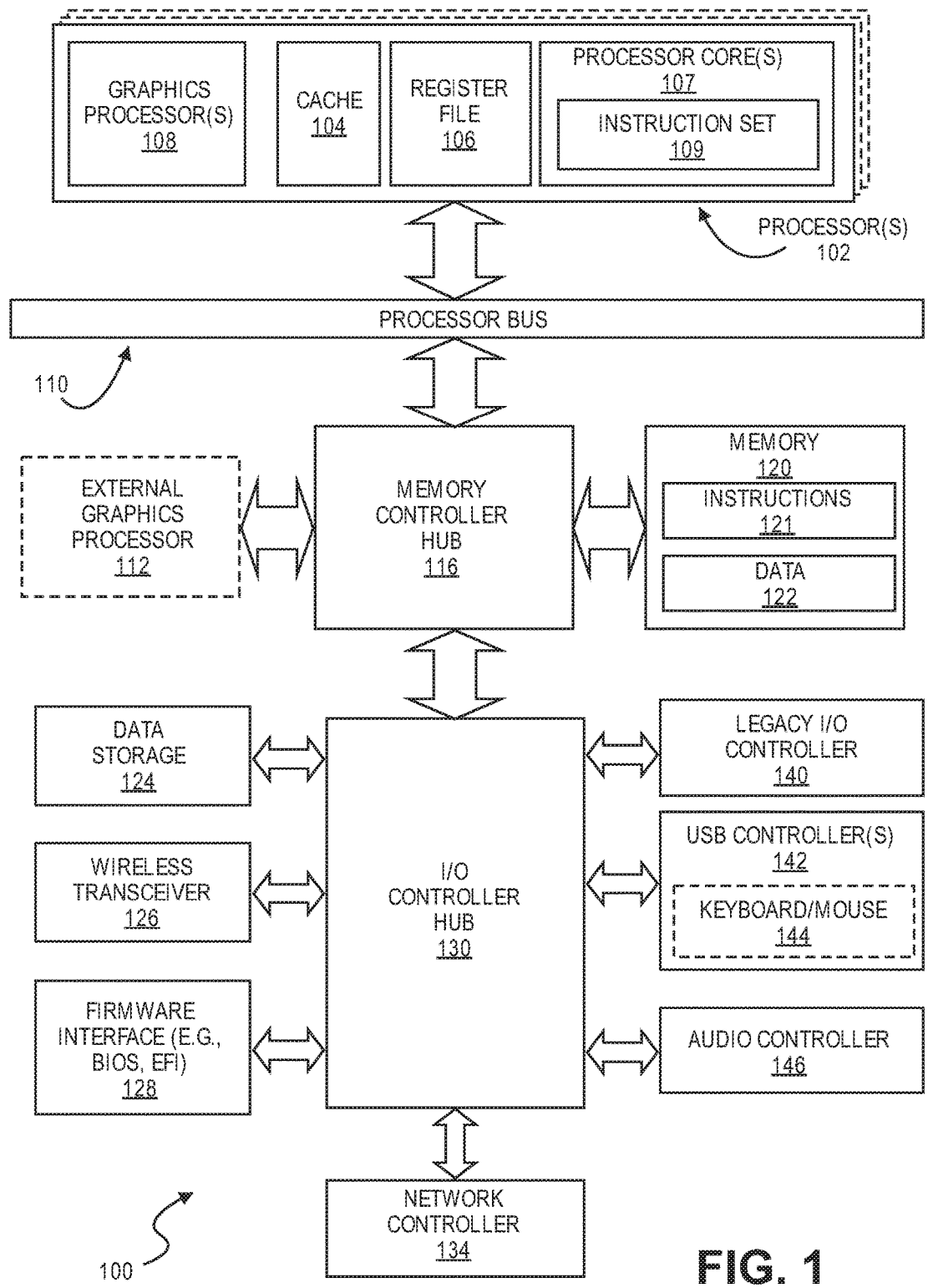
FIG. 1 is a block diagram of a processing system, according to an embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a smart technique for computing a screen space metric ("image space compression metric", "space compression metric", "space metric", "compression metric" or simply "metric"), which may then be used to determine how (much) the data is to be compressed in order to deliver it without or with minimal loss of quality. In one embodiment, 3D scene data, such as geometry, may be observed in camera space to determine how the 3D data is to be projected on a two-dimensional (2D) screen space for the final display, via a display screen, to the user, or saved to a file. For example, the transformation of the 3D scene data into the 2D screen data is generally a form of data quantization from high precision floating points to discrete integer pixel coordinates of the 2D display screen.

In one embodiment, based on the screen resolution and the location of the geometry data in 3D space, a metric may be obtained which may then used to measure an error of quantization and provide a metric by which a number of bits to compress the data can be determined depending on the quantization method and desired visual quality. For example, this technique may be applied in a ray tracing renderer once a model view (e.g., camera view) transformation is known, but prior to loading and processing the 3D scene data, during which, this metric and any quantization techniques may be combined to maximize visual quality while allowing the data to fit in available memory.

It is contemplated that an "application" may refer to or include a computer program, a software application, a game, a workstation application, etc., offered thorough an API, such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow". For example, a workload, such as a 3D game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency along with brevity, clarity, and ease of understanding, a single term, such as "dispatch" or "application", etc., may be used throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
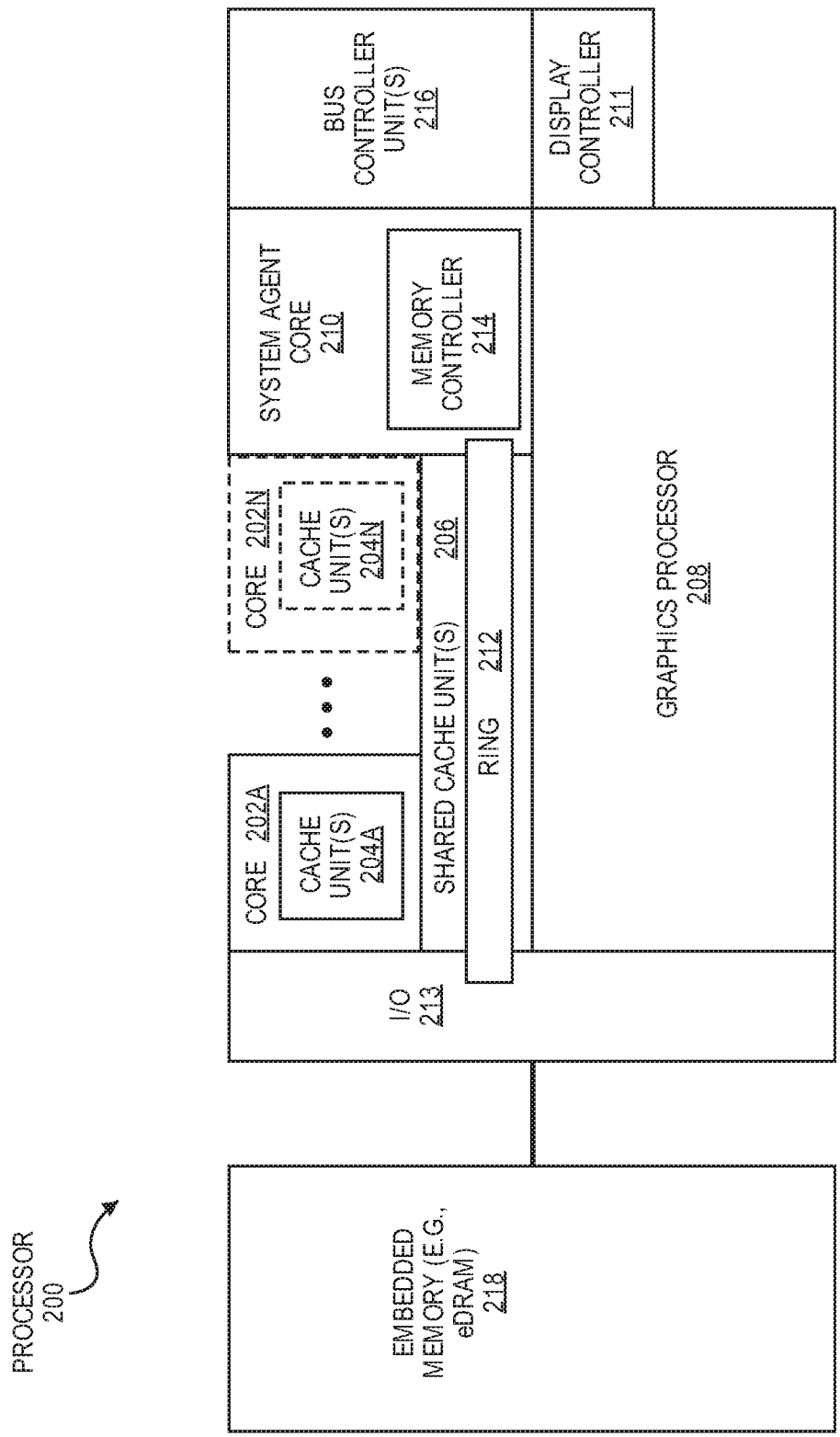
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
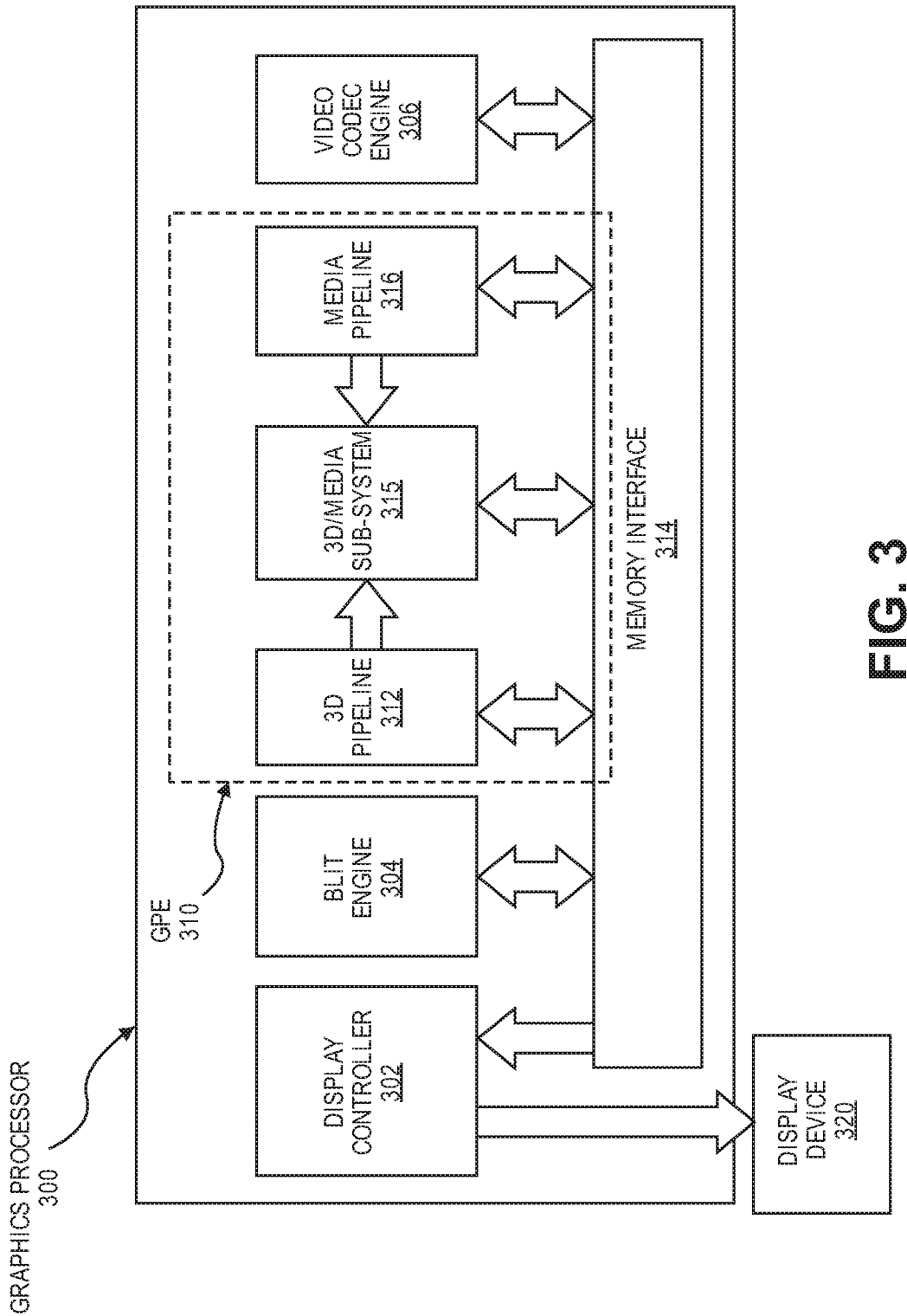
FIG. 3 is a block diagram of a graphics processor, which may be a discrete graphics processing unit, or may be a graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
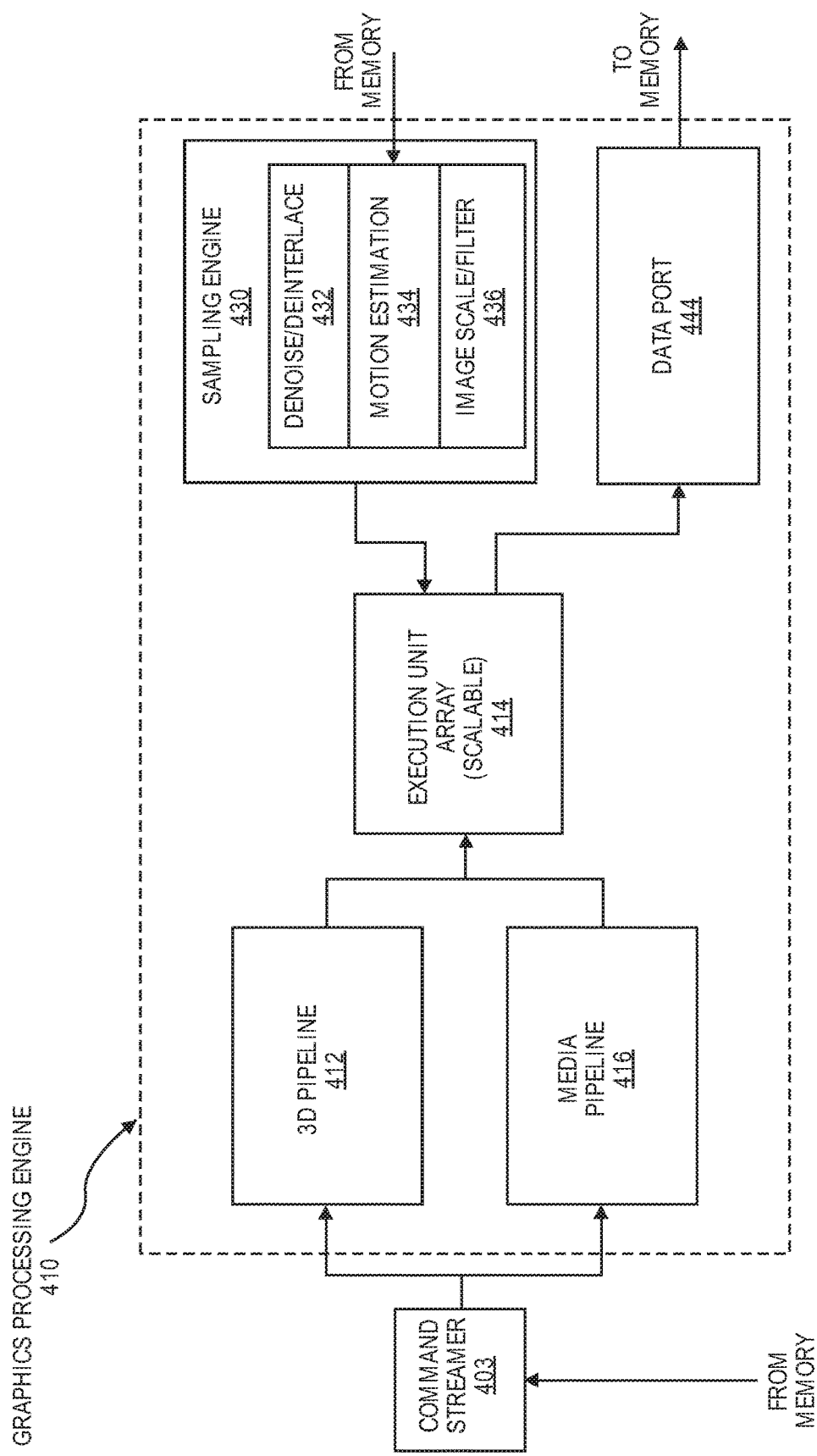
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
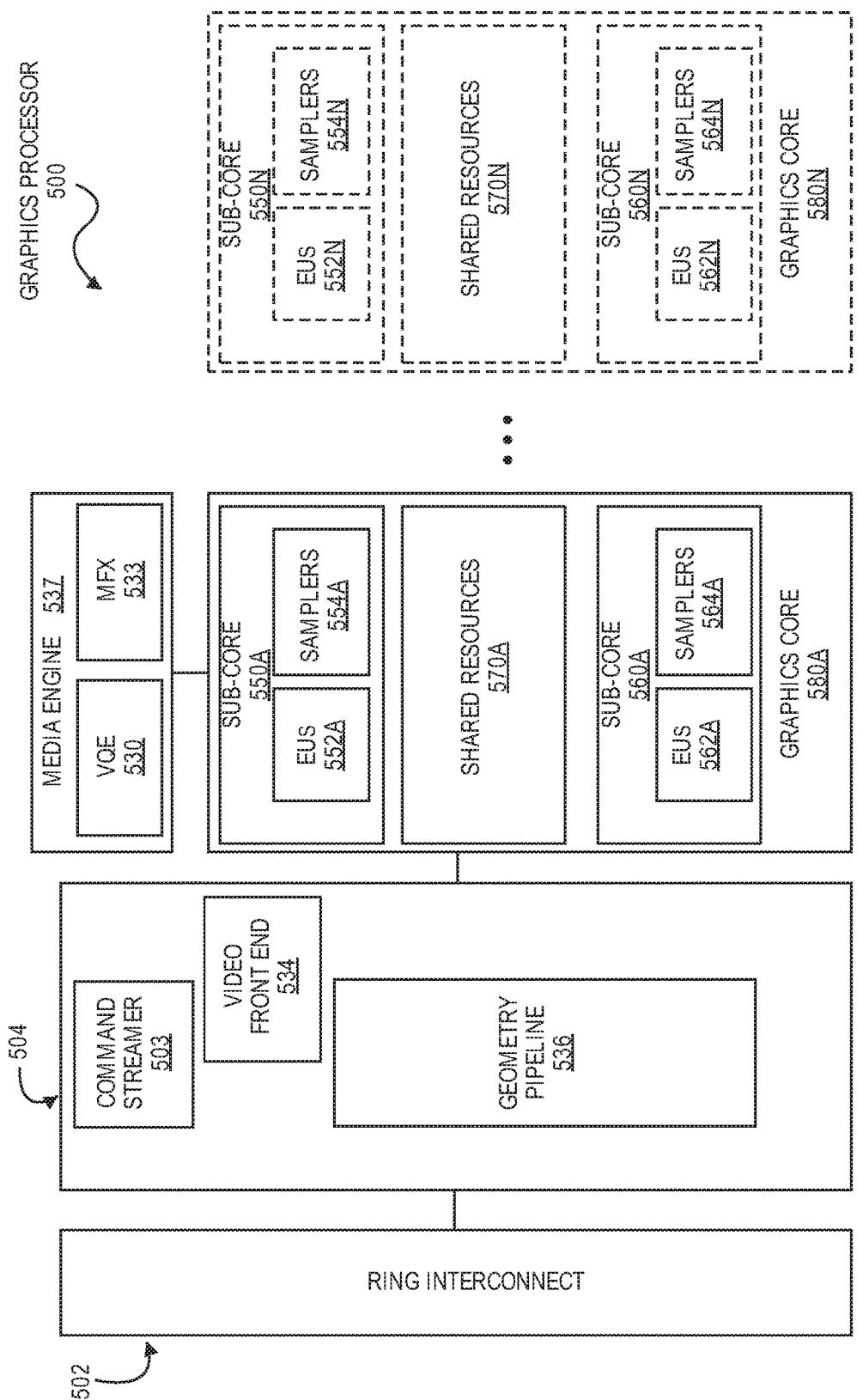
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
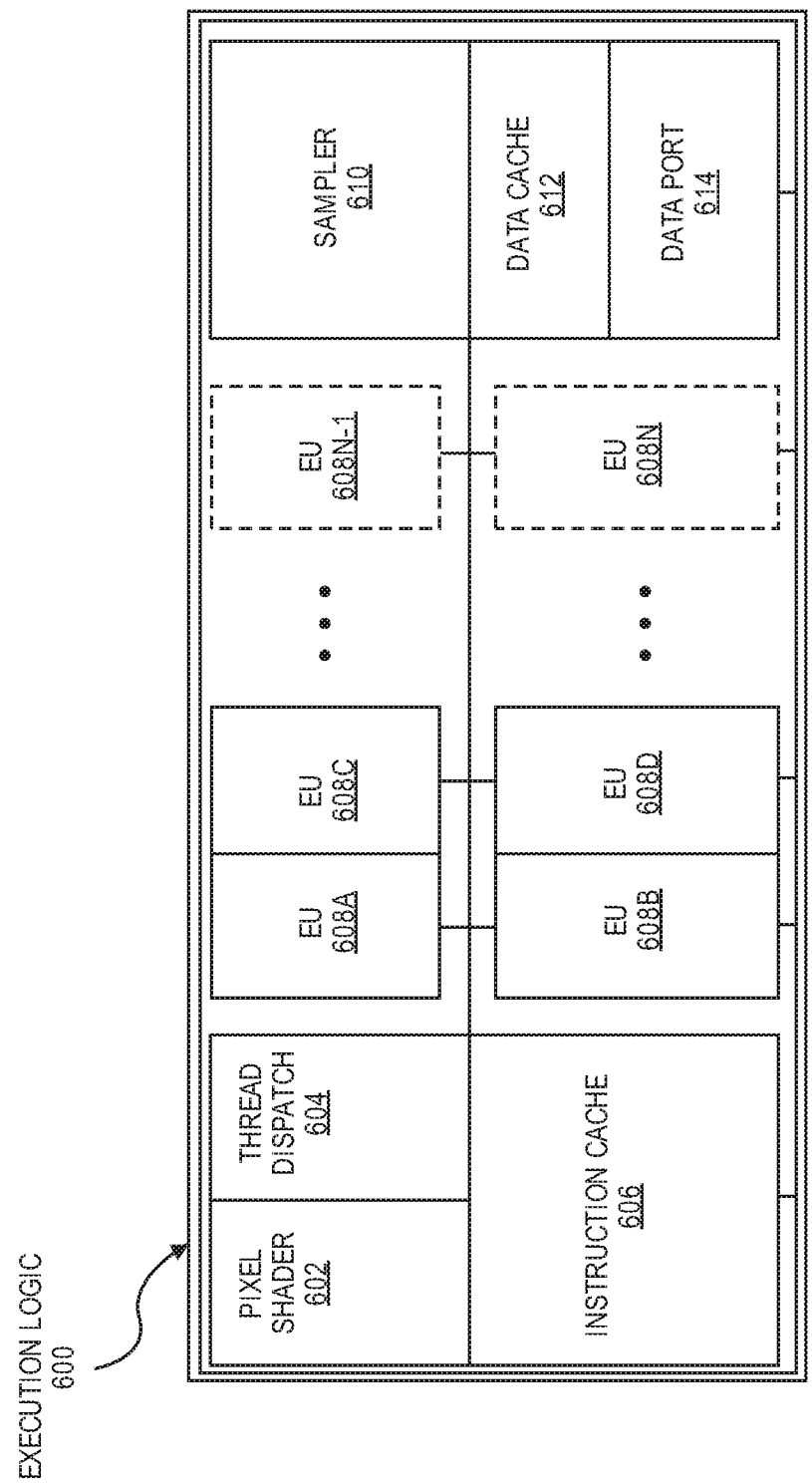
FIG. 6 illustrates thread execution logic including an array of processing elements employed in some embodiments of a graphics processing engine.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
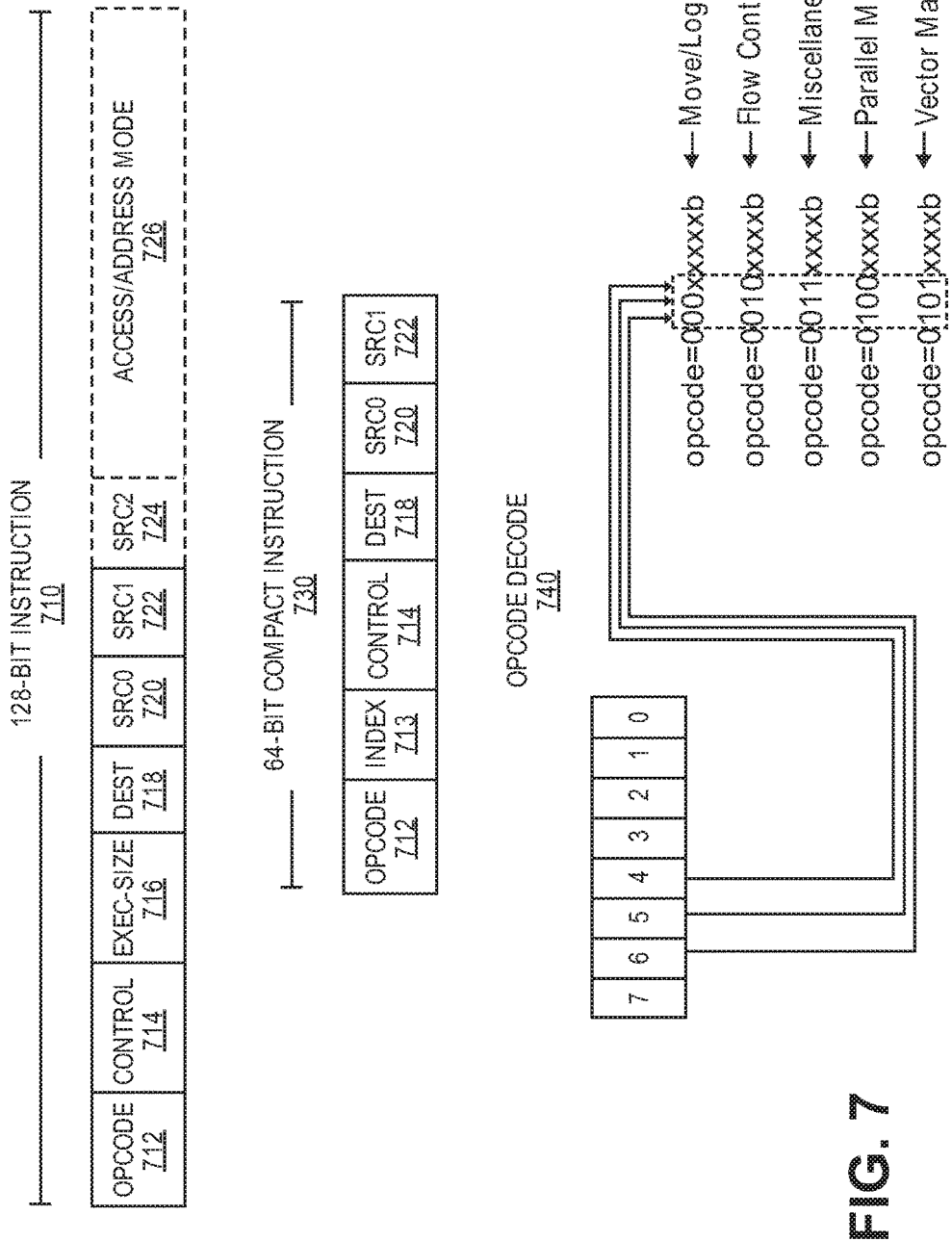
FIG. 7 is a block diagram illustrating a graphics processor instruction formats according to some embodiments.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
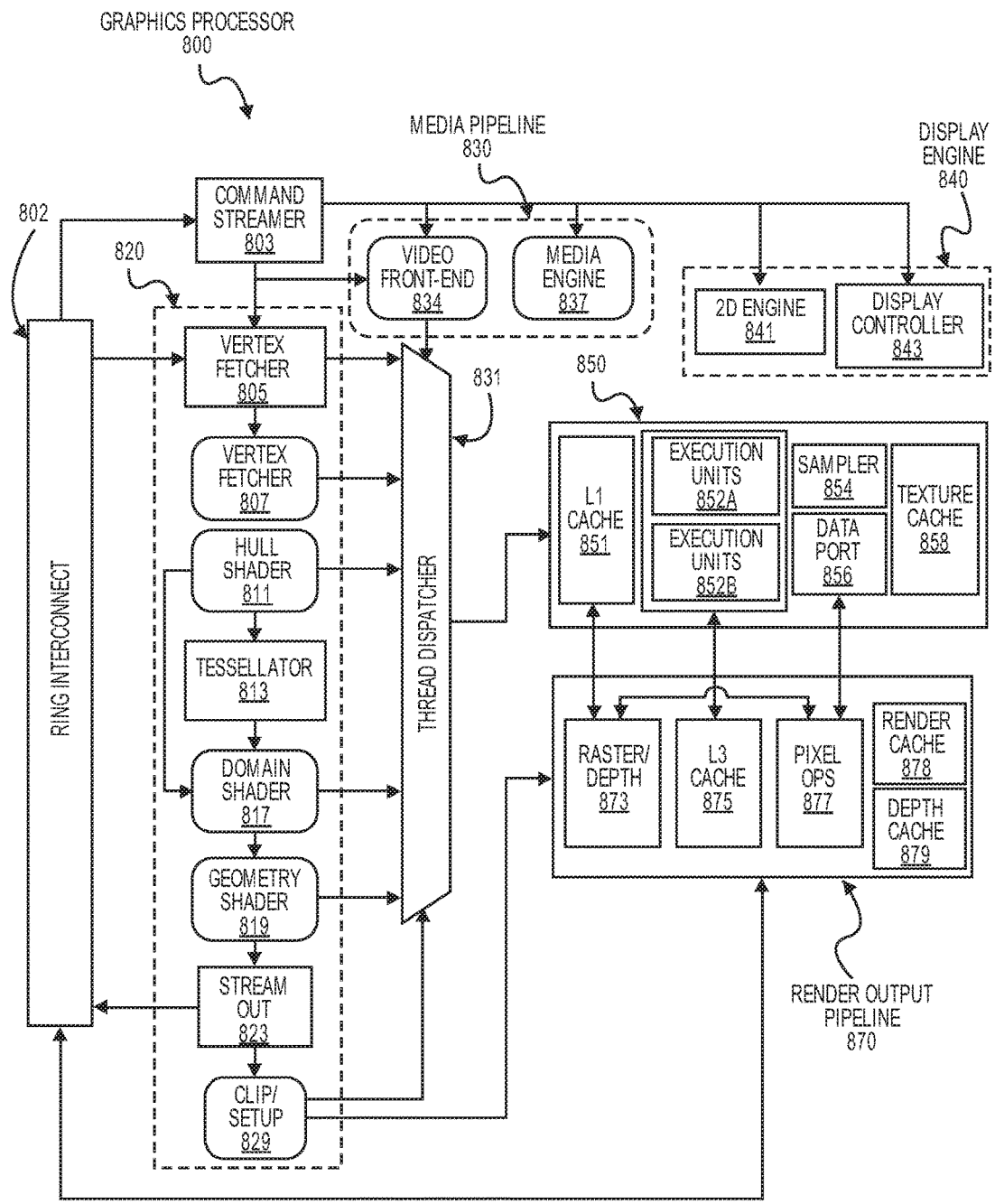
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
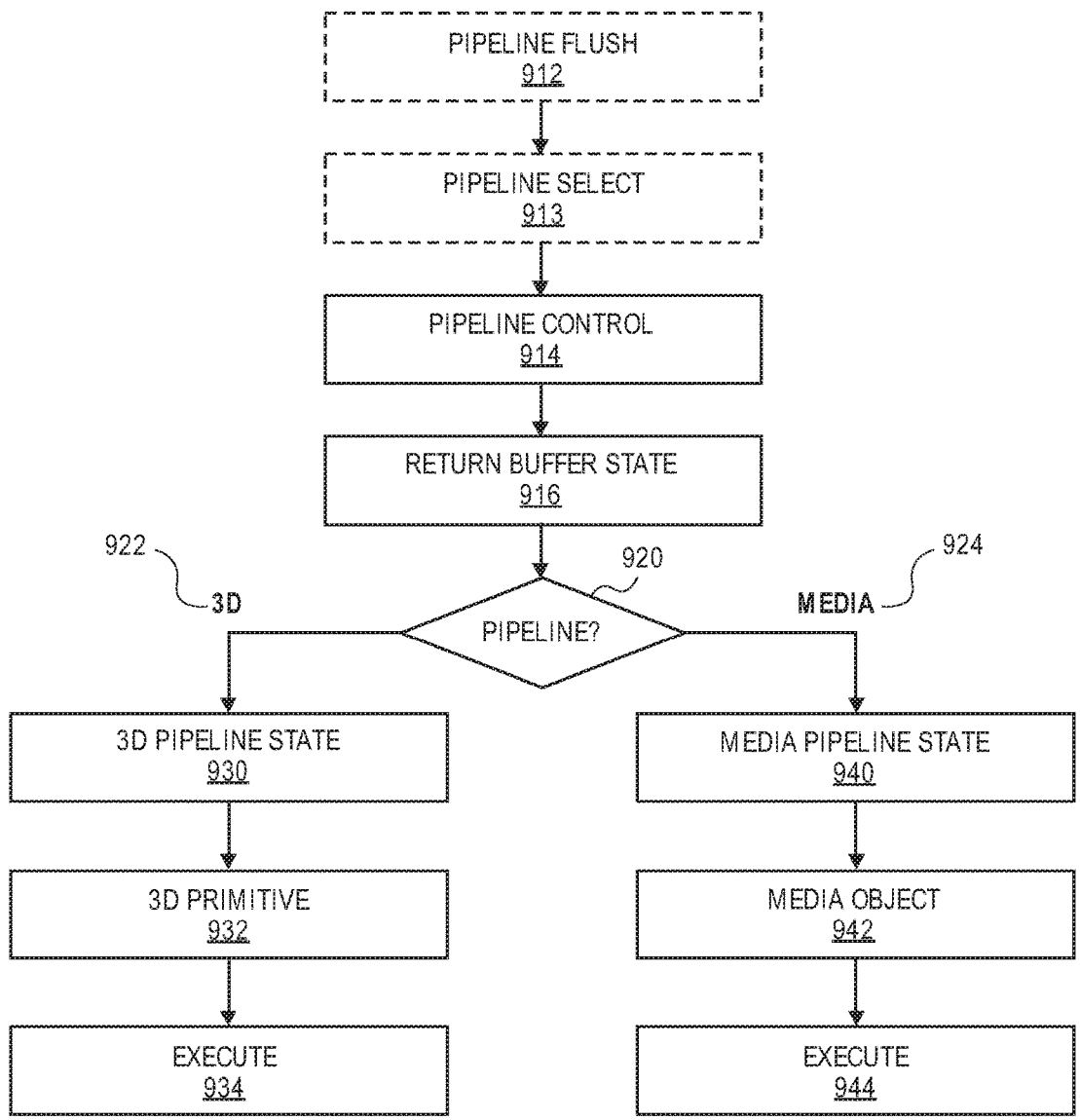
FIG. 9A is a block diagram illustrating a graphics processor command format according to an embodiment and FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
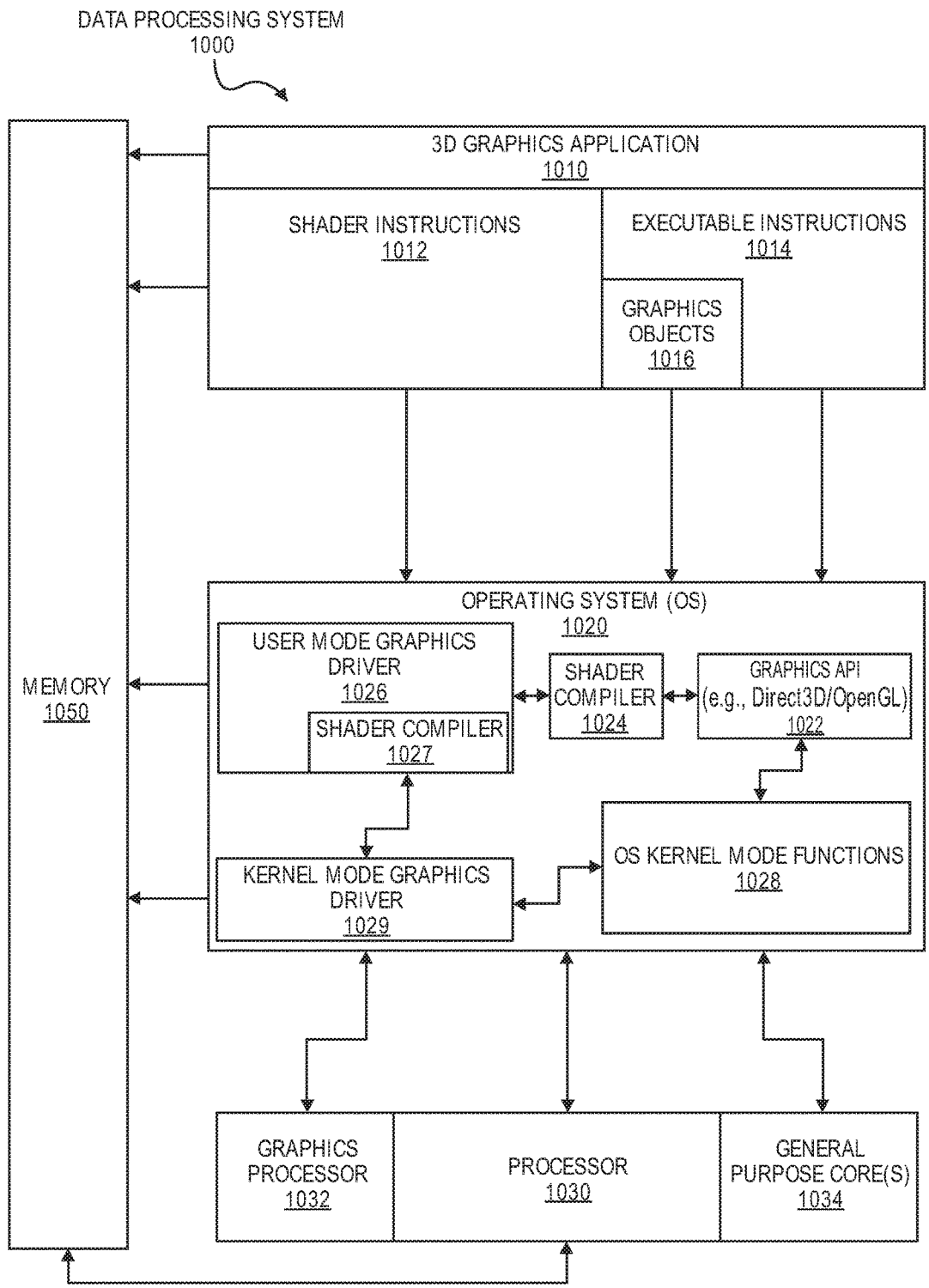
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
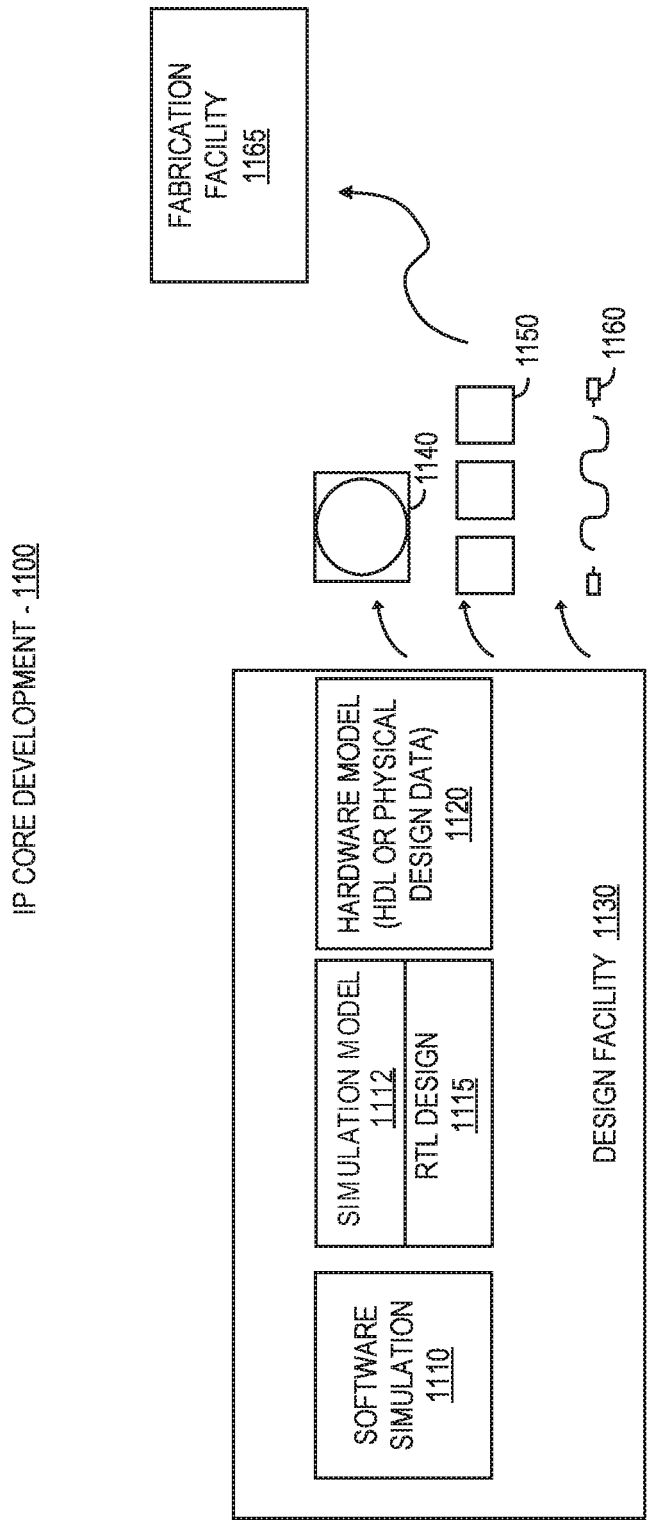
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
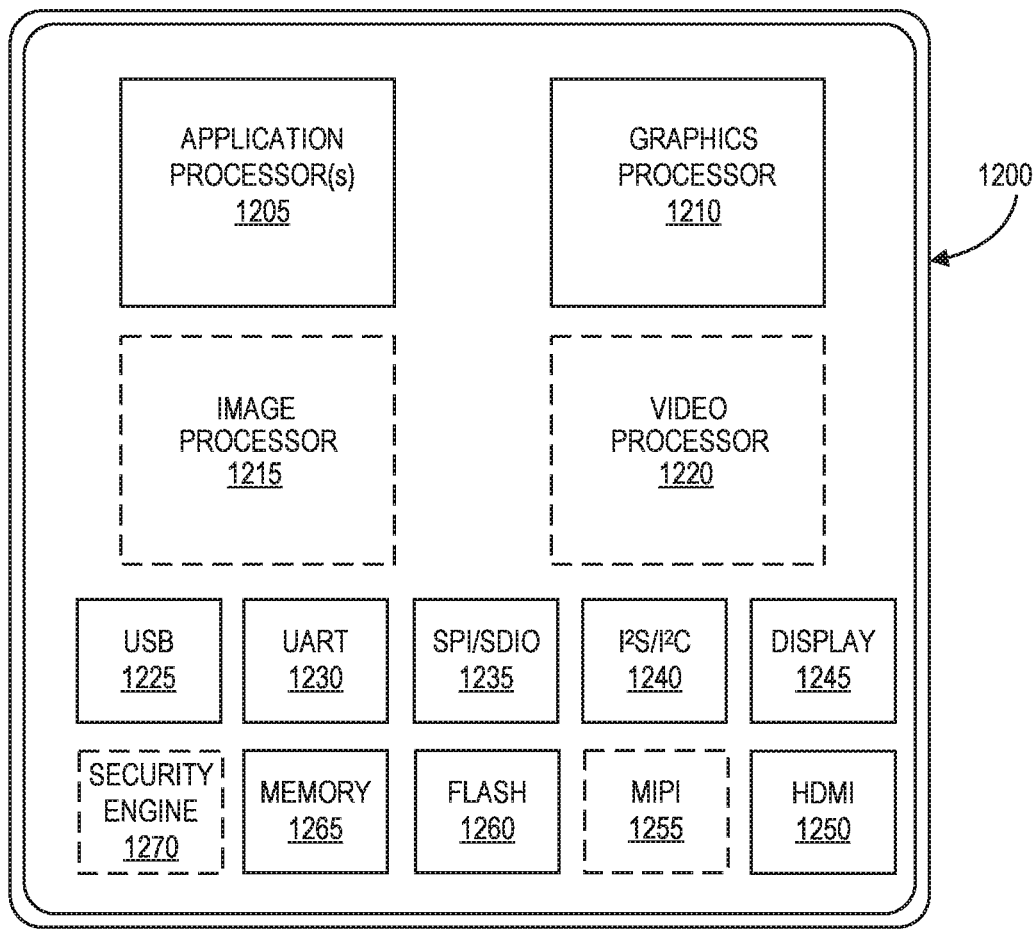
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Figure 13:
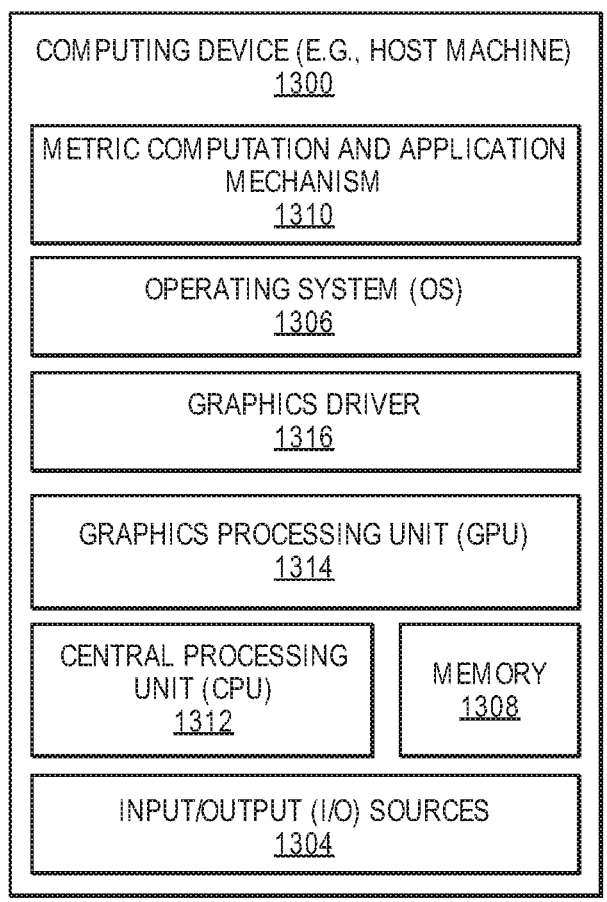
FIG. 13 illustrates a computing device hosting a metric computation and application mechanism according to one embodiment.

FIG. 13 illustrates a computing device 1300 hosting a metric computation and application mechanism 1310 according to one embodiment. Computing device 1300 (e.g., mobile computer, wearable device, Internet of Things (IoT) device, laptop computer, desktop computer, server computer, etc.) may be the same as data processing system 100 of FIG. 1 and accordingly, for brevity, clarity, and ease of understanding, many of the details stated above with reference to FIGS. 1-12 are not further discussed or repeated hereafter. Computing device 100 may server a host machine hosting metric computation and application mechanism ("metric mechanism") 1310 having one or more components, as illustrated with respect to FIG. 14, to perform one or more tasks relating to computation and application of metrics.

Throughout the document, the term "user" may be interchangeably referred to as "viewer", "observer", "person", "individual", "end-user", and/or the like. It is to be noted that throughout this document, terms like "graphics domain" may be referenced interchangeably with "graphics processing unit" or simply "GPU" and similarly, "CPU domain" or "host domain" may be referenced interchangeably with "computer processing unit" or simply "CPU".

Computing device 1300 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1300 may include mobile computing devices serving as communication devices, such as cellular phones including smartphones, personal digital assistants (PDAs), tablet computers, laptop computers, e-readers, smart televisions, television platforms, game consoles, portable workstations, wearable devices (e.g., glasses, watches, bracelets, smartcards, jewelry, clothing items, etc.), IoT devices (e.g., home security systems, washers/dryers, sprinkler systems, light control systems, etc.), media players, etc. For example, in one embodiment, computing device 1300 may include a mobile computing device employing an integrated circuit ("IC"), such as system on a chip ("SoC" or "SOC"), integrating various hardware and/or software components of computing device 1300 on a single chip.

As illustrated, in one embodiment, in addition to employing metric mechanism 1310, computing device 1300 may further include any number and type of hardware components and/or software components, such as (but not limited to) GPU (also referred to as "graphics processor") 1314, graphics driver (also referred to as "GPU driver", "graphics driver logic", "driver logic", or simply "driver") 1316, CPU (also referred to as "application processor") 1312, memory 1308, network devices, drivers, or the like, as well as input/output (I/O) sources 1304, such as touchscreens, touch panels, touch pads, virtual or regular keyboards, virtual or regular mice, ports, connectors, etc. Computing device 1300 may include operating system (OS) 1306 serving as an interface between hardware and/or physical resources of the computer device 1300 and a user. It is contemplated that CPU 1312 may include one or processors, such as processor(s) 102 of FIG. 1, while GPU 1314 may include one or more graphics processors, such as graphics processor(s) 108 of FIG. 1.

In one embodiment, metric mechanism 1310 may be employed or hosted as illustrated in FIG. 13 or, in another embodiment, metric mechanism 1310 may be part of graphics driver 1316. In yet another embodiment, metric mechanism 1310 may be part of firmware of GPU 1314 or, in yet another embodiment, metric mechanism 1310 may be a hardware component being part of GPU 1314.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-12, some processes of the graphics pipeline as described above are implemented in software, while the rest are implemented in hardware. A graphics pipeline may be implemented in a graphics coprocessor design, where CPU 1312 is designed to work with GPU 1314 which may be included in or co-located with CPU 1312. In one embodiment, GPU 1314 may employ any number and type of conventional software and hardware logic to perform the conventional functions relating to graphics rendering as well as novel software and hardware logic to execute any number and type of instructions, such as instructions 121 of FIG. 1, to perform the various novel functions of metric mechanism 1310 as disclosed throughout this document.

As aforementioned, memory 1308 may include a random access memory (RAM) comprising application database having object information. A memory controller hub, such as memory controller hub 116 of FIG. 1, may access data in the RAM and forward it to GPU 1314 for graphics pipeline processing. RAM may include double data rate RAM (DDR RAM), extended data output RAM (EDO RAM), etc. CPU 1312 interacts with a hardware graphics pipeline, as illustrated with reference to FIG. 3, to share graphics pipelining functionality. Processed data is stored in a buffer in the hardware graphics pipeline, and state information is stored in memory 1308. The resulting image is then transferred to I/O sources 1304, such as a display component, such as display device 320 of FIG. 3, for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1308 may comprise a pre-allocated region of a buffer (e.g., frame buffer); however, it should be understood by one of ordinary skill in the art that the embodiments are not so limited, and that any memory accessible to the lower graphics pipeline may be used. Computing device 1300 may further include input/output (I/O) control hub (ICH) 130 as referenced in FIG. 1, one or more I/O sources 1304, etc.

CPU 1312 may include one or more processors to execute instructions in order to perform whatever software routines the computing system implements. The instructions frequently involve some sort of operation performed upon data. Both data and instructions may be stored in system memory 1308 and any associated cache. Cache is typically designed to have shorter latency times than system memory 1308; for example, cache might be integrated onto the same silicon chip(s) as the processor(s) and/or constructed with faster static RAM (SRAM) cells whilst the system memory 1308 might be constructed with slower dynamic RAM (DRAM) cells. By tending to store more frequently used instructions and data in the cache as opposed to the system memory 1308, the overall performance efficiency of computing device 1300 improves. It is contemplated that in some embodiments, GPU 1314 may exist as part of CPU 1312 (such as part of a physical CPU package) in which case, memory 1308 may be shared by CPU 1312 and GPU 1314 or kept separated.

System memory 1308 may be made available to other components within the computing device 1300. For example, any data (e.g., input graphics data) received from various interfaces to the computing device 1300 (e.g., keyboard and mouse, printer port, Local Area Network (LAN) port, modem port, etc.) or retrieved from an internal storage element of the computer device 1300 (e.g., hard disk drive) are often temporarily queued into system memory 1308 prior to their being operated upon by the one or more processor(s) in the implementation of a software program. Similarly, data that a software program determines should be sent from the computing device 1300 to an outside entity through one of the computing system interfaces, or stored into an internal storage element, is often temporarily queued in system memory 1308 prior to its being transmitted or stored.

Further, for example, an ICH, such as ICH 130 of FIG. 1, may be used for ensuring that such data is properly passed between the system memory 1308 and its appropriate corresponding computing system interface (and internal storage device if the computing system is so designed) and may have bi-directional point-to-point links between itself and the observed 110 sources/devices 1304. Similarly, an MCH, such as MCH 116 of FIG. 1, may be used for managing the various contending requests for system memory 1308 accesses amongst CPU 1312 and GPU 1314, interfaces and internal storage elements that may proximately arise in time with respect to one another.

I/O sources 1304 may include one or more I/O devices that are implemented for transferring data to and/or from computing device 1300 (e.g., a networking adapter); or, for a large scale non-volatile storage within computing device 1300 (e.g., hard disk drive). User input device, including alphanumeric and other keys, may be used to communicate information and command selections to GPU 1314. Another type of user input device is cursor control, such as a mouse, a trackball, a touchscreen, a touchpad, or cursor direction keys to communicate direction information and command selections to GPU 1314 and to control cursor movement on the display device. Camera and microphone arrays of computer device 1300 may be employed to observe gestures, record audio and video and to receive and transmit visual and audio commands.

Computing device 1300 may further include network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1300 may vary from implementation to implementation depending upon numerous factors, such as price constraints, performance requirements, technological improvements, or other circumstances. Examples of the electronic device or computer system 1300 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Figure 14:
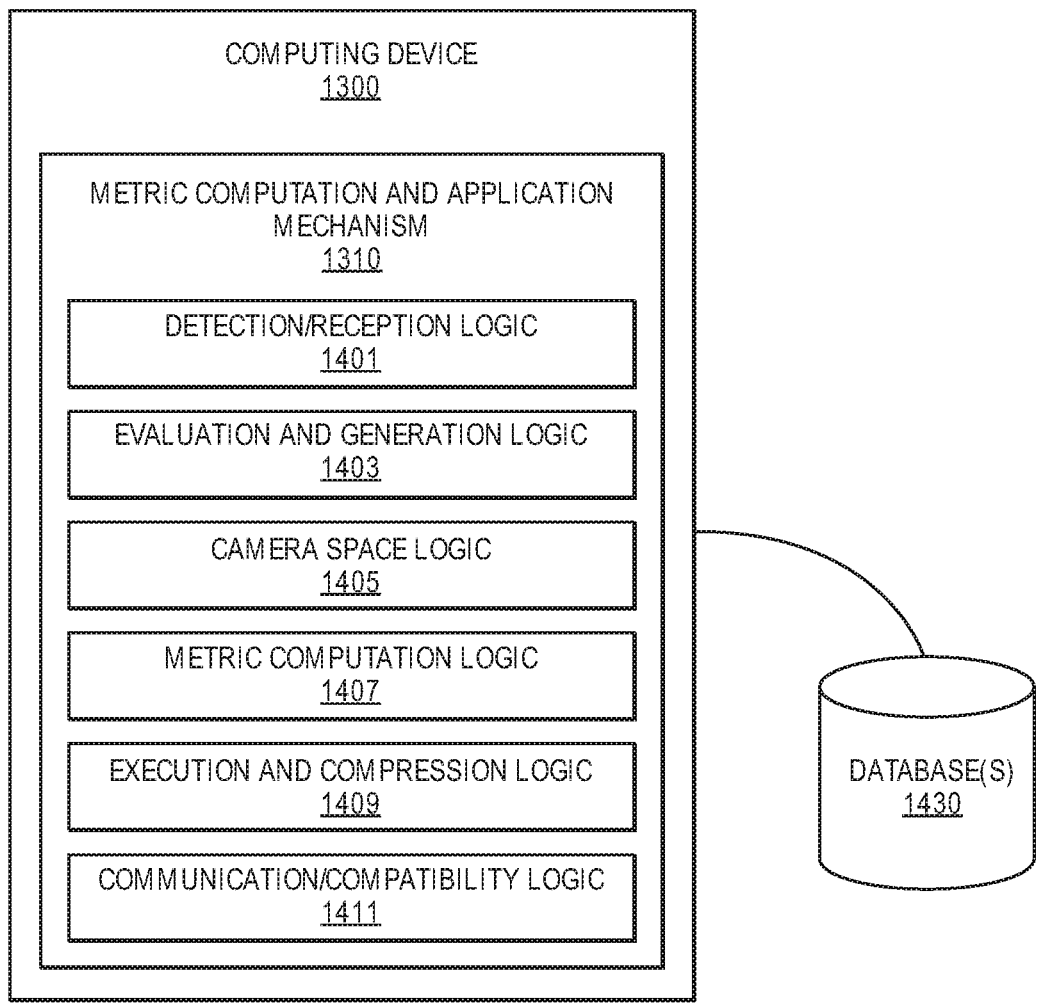
FIG. 14 illustrates a metric computation and application mechanism according to one embodiment.

FIG. 14 illustrates a metric computation and application mechanism 1310 according to one embodiment. As an initial matter, for brevity, many of the details already discussed with reference to FIG. 1-13 are not repeated or discussed hereafter. In one embodiment, metric mechanism 1310 may include any number and type of components, such as (without limitation): detection/reception logic 1401; evaluation and generation logic 1403; camera space logic 1405; metric computation logic 1407; execution and compression logic 1409; and communication/compatibility logic 1411. Computing device 1300 may be further in communication with one or more repositories or data sources, such as database(s) 1430 (e.g., cloud database, non-cloud database, etc.), where the communication may be direct or over one or more one or more networks (e.g., Cloud-based network, the Internet, proximity network, IoT, etc.).

As an initial matter, it is contemplated that a large 3D geometry that is far from the camera results, when put through proper perspective transformation, merely results in a single pixel on a 2D screen, the large amount of precisions may not be needed and thus, for example, this novel data compression is successful applied since when on the 2D screen, these large amounts of precisions of the 3D geometry are unneeded and thus unnecessary. Further, this novel metric, in one embodiment, may not depend on the underlying quantization technique, where the metric provides an accurate bound on how much precision may be needed for quantized geometry data to be visually indistinguishable from the reference geometry, which may be performed at arbitrary accuracy even at a sub-pixel level. Embodiments provide a novel technique for using the metric to allow compressions techniques to bound their errors, such as whatever the error (e.g., shadow projection, direct visibility, etc.), this novel technique reduces the errors, if any, for the screen space.

For example, when considering a movie production pipeline and its animated scenes, for each frame, the scene data may be different from that of the previous frame and thus acceleration data structures, such as the BVH, may be rebuilt for each frame. This allows the metric to be recomputed and used for quantization. This may be before rendering each frame. It is contemplated that heavy scenes need quantization, where a heavy scene may include a scene that is incapable of fitting in main memory (e.g., 32 GB or more) on a render farm node, such as each frame may take an hour or much more (e.g., 6 to 10 hours) to render a single frame.

Now, for example, when geometry data does not change and merely the camera moves, a common issue with floating point data (represented in 32 bits) deals with acquiring computational precision in large-scaled scenes, such as when things are specified in world space, the precision issue may be amplified. For example, in case of a camera and a 3D mesh far away from the origin, even if the relative distance is small, the 3D position data may be represented at a much lower precision than if located close to the origin due to a floating point representation. This issued is amplified when the camera moves away from the mesh. For example, the 3D mesh may be transformed from the world space to the camera space before ray tracing and if the camera-position changes between the frames are small, then it is regarded as unlikely to cause any issues due to quantization metrics. However, when the movement is large or even extreme in some cases, then the geometry data may be retransformed to work around the floating point precision, while the quantization metrics can be recomputed at this time. The metric may also be recomputed at any time as the application requires. If the camera positions are known before rendering a sequence of frames, multiple quantization metrics may be computed based on camera positions across multiple frames and in such a case, the best camera position may be chosen to quantize the static geometry data.

In one embodiment, detection/reception logic 1401 to detect a screen space representing 2D display of data as viewed by an end-user using a display device. For example, the relevant screen data may be obtained from a data repository, such as database(s) 1430, which is then loaded by renderer engine/application during the rendering process, wherein this screen space is detected by detection/reception logic 1401. Since the screen space presentation of data is a 2D representation that the user views which is substantially different from the 3D view of camera space presentation of data, upon detection of the screen space by detection/reception logic 1401, in one embodiment, this screen space presentation is provided in a 3D presentation as canonical view space as facilitated by evaluation and generation logic 1403.

Figure 15A:
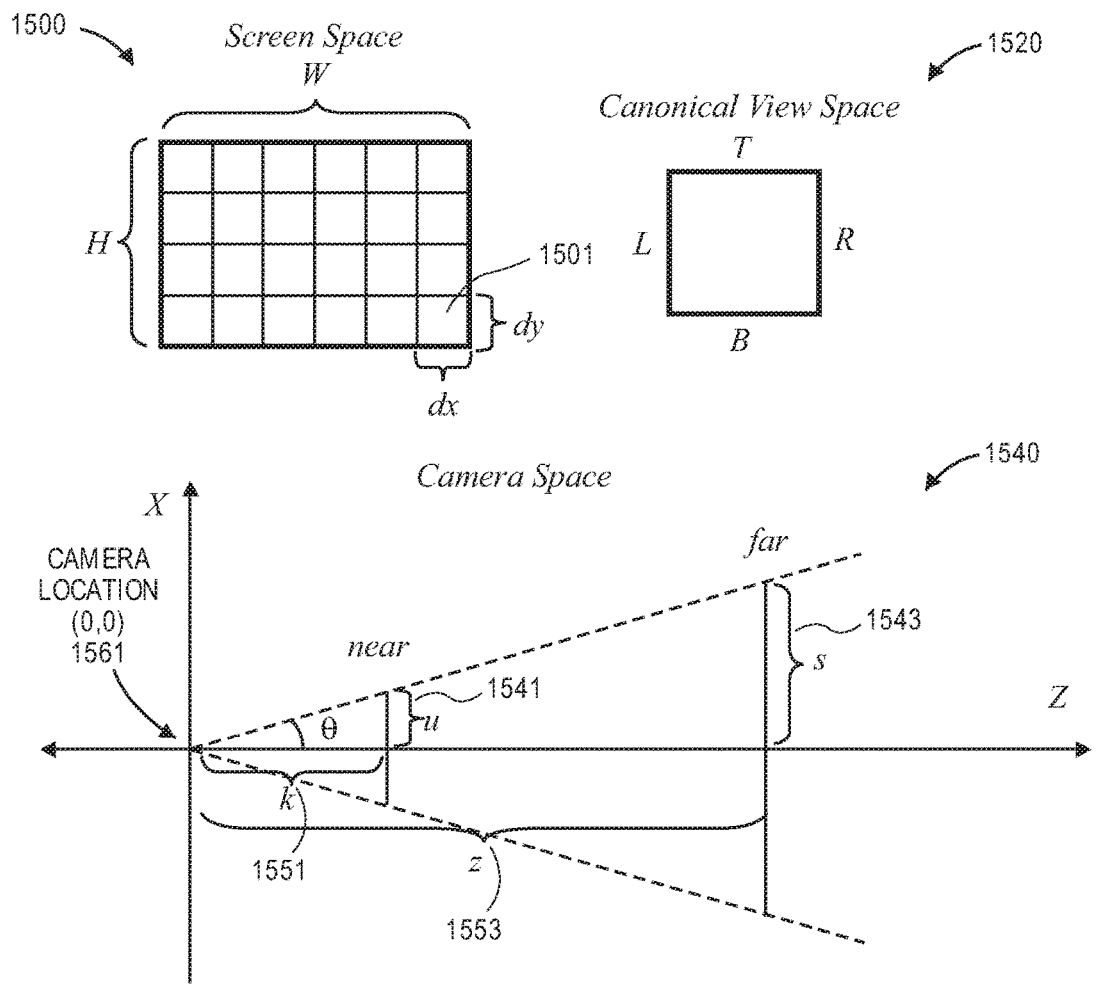
FIG. 15A illustrates a screen space, a canonical view space, and a camera space as used for facilitating computation of a metric according to one embodiment.

For example and in one embodiment, evaluation and generation logic 1403 evaluates the screen space and then appropriately mapped to a canonical view space, as shown in FIG. 15A, that represents a the screen space. In one embodiment, although the canonical view space may be a 3D representation, such as a cube, for the sake of computing the metric, merely the four sides of the canonical view space may be of relevance to computation of the metric.

Figure 15B:
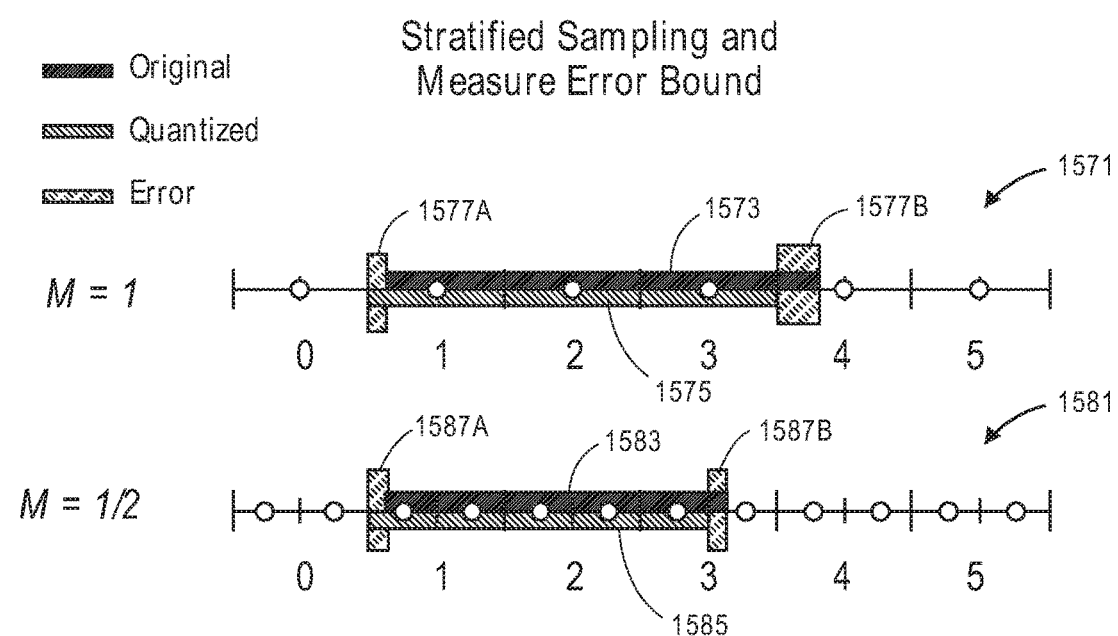
FIG. 15B illustrates stratified sampling and metric error bound according to one embodiment.

In reviewing the screen space and the canonical view space, in one embodiment, camera space logic 1405 may be used to review the perspective camera view transform to help derive a metric that may then be described in relation to the geometry's distance from the camera. For example, the camera space logic, as shown in FIG. 15B, may allow camera space logic 1405 to realize the camera location at origin, such as 0,0 on the graph, and accordingly, compute the distance, z, from the geometry of the object to the camera, such as how small being near the camera as opposed to how big being far from the camera, etc.

For example, this moving or changing of distance, z, of the geometry of the object with respect to the camera at the origin as facilitated by camera space logic 1405 allows metric computation logic 1407 to compute the size of the geometry at each distance, z1, z2, z3 etc., from the camera. In one embodiment, this further allows metric computation logic 1407 to compute an initial metric, m, by computing the rate of change of units at each distance with respect to changes in screen space. In one embodiment, metric computation logic 1407 is further used to scale this initial metric, m, to a desired quality, which results in computation of a final metric, M. In one embodiment, execution and compression logic 1409 may be used to quantize and compress geometry data using desired and relevant algorithms based on the final metric, M.

Communication/compatibility logic 1411 may be used to facilitate dynamic communication and compatibility between computing device 1300 and any number and type of other computing devices (such as mobile computing device, desktop computer, server computing device, etc.), processing devices (such as CPUs, GPUs, etc.), capturing/sensing/detecting devices (such as capturing/sensing components including cameras, depth sensing cameras, camera sensors, RGB sensors, microphones, etc.), display devices (such as output components including display screens, display areas, display projectors, etc.), user/context-awareness components and/or identification/verification sensors/devices (such as biometric sensors/detectors, scanners, etc.), memory or storage devices, databases, and/or data sources (such as data storage devices, hard drives, solid-state drives, hard disks, memory cards or devices, memory circuits, etc.), communication channels or networks (e.g., Cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, etc., business applications, games and other entertainment applications, etc.), programming languages, etc., while ensuring compatibility with changing technologies, parameters, protocols, standards, etc.

Throughout this document, terms like "logic", "component", "module", "framework", "engine", and the like, may be referenced interchangeably and include, by way of example, software, hardware, and/or any combination of software and hardware, such as firmware. Further, any use of a particular brand, word, term, phrase, name, and/or acronym, such as "GPU", "GPU domain", "GPGPU", "CPU", "CPU domain", "graphics driver", "workload", "application", "frame", "work unit", "draw", "dispatch", "API", "hardware", "software", "metric", "quantization", "compression", "screen space", "canonical view space", "camera space", "camera data", "geometry data", "geometry", "geometries", etc., should not be read to limit embodiments to software or devices that carry that label in products or in literature external to this document.

It is contemplated that any number and type of components may be added to and/or removed from metric mechanism 1310 to facilitate various embodiments including adding, removing, and/or enhancing certain features. For brevity, clarity, and ease of understanding of metric mechanism 1310, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 15A illustrates a screen space 1500, a canonical view space 1520, and a camera space 1540 as used for facilitating computation of a metric according to one embodiment. As discussed previously with regard to FIGS. 13-14, various processes relating to screen space 1500, canonical view space 1520, and camera space 1540 may be performed by processing logic that may comprise hardware (e.g., circuitry, dedicated logic, programmable logic, etc.), software (such as instructions run on a processing device), or a combination thereof, as facilitated by metric mechanism 1310 of FIGS. 13-14. However, for brevity, many of the details discussed with reference to the preceding FIGS. 1-14 may not be discussed or repeated hereafter.

In one embodiment, scene data, such as from an animated movie, may be accessed at or obtained from one or more data repositories, such as database(s) 1430 of FIG. 14, and loaded for a rendering process, where the illustrated screen space 1500 may be regarded as a 2D representation of that scene data through projection. For example, the two sides of the 2D data of screen space 1500 is shown as W×H, where small boxes within W×H are pixels, such as pixel 1501 shown as measuring dy×dx. Now, canonical view space 1520 may regarded as a 3D data representation of the 3D data of screen space 1500. For example, in the illustrated embodiment, canonical view space 1520 may be a 3D cube, but for metric measurements, in one embodiment, merely the four sixes of canonical view space 1520 may be necessitated, such as T×B×L×R.

Considering screen resolution of W×H, of screen space 1500 in terms of a number of pixels, canonical view space 1520 of $(x,y,z) \in [-1,1]^3$ may be mapped to the screen, W×H, of screen space 1500 through a viewport matrix, $M_v$ (where the z value may be ignored). Similarly, a perspective projection matrix, $M_{per}$, may be used to map the camera frustum, as obtained from camera space 1540, to canonical view space 1520. Further, a camera at camera location 1561 (e.g., 0,0) may also be defined by a transformation matrix, $M_{cam}$, to position the camera in the world space, where these matrices are concatenated to result in a model-view transformation matrix, such as $M=M_v M_{per} M_{cam}$, that is used to appropriately map 3D geometries 1541, 1543 of camera space 1540 onto the 2D screen of screen space 1500.

In one embodiment, camera space 1540 allows for a quick overview of the perspective camera view transform, which may then describe the metric derived from this transformation in relation to distances k 1551, z 1553 of geometries u 1541, s 1543 from the camera at camera location 1561 at the origin or cross-section of the X-axis and the Z-axis, marked as 0,0. As described with reference to FIG. 14, in one embodiment, camera space logic 1405 and metric computation logic 1407 may be used to work with camera space 1540 to compute the metric. For example, assuming all geometries u 1541, s 1543 are transformed from the world space to camera space 1540, where the camera is placed at camera location 1561 at the origin, 0,0, facing the −z direction, (dx/du, dy/dv) may be computed in screen space 1500 with respect to canonical view space 1520 (which is mapped to the near plane as (u, v) in camera space 1540) as follows:

$$u = L + \frac{(R-L)x}{W}$$
$$v = B + \frac{(T-B)y}{H}$$
$$\frac{dx}{du} = \frac{W}{R-L}$$
$$\frac{dy}{dv} = \frac{H}{T-B}$$

In one embodiment, a determination is made as to how much geometry s 1543 at distance z 1553 changes with respect to geometry u 1541 at distance k 1551 if geometry s 1543 is moved back-and-forth on the Z-axis with respect to geometry u 1541 and the camera at camera location (0,0) 1561. For example, this can be contemplated as a segment on a line parallel to the X-axis and distance z 1553 from the origin (0,0) (e.g., camera location 1561) with respect to u 1541 at the near plane, which is:

$$\frac{u}{|k|} = \frac{s}{|z|}$$
$$\frac{du}{ds} = \left|\frac{k}{z}\right|$$

Now, referring back to screen space 1500, assuming square pixels in screen space 1500, where W=H and dx=dy, the initial quantization metric, m, is defined as the inverse of the change to geometry s 1543 with respect to each unit of change, dx, in screen space 1500, $$m = \left[\frac{dx}{ds}\right]^{-1} = \left[\frac{dx}{du} \cdot \frac{du}{ds}\right]^{-1} = \left[\frac{W}{R-L} \cdot \left|\frac{k}{z}\right|\right]^{-1} = \frac{R-L}{W} \cdot \left|\frac{z}{k}\right|$$

Similar results can be obtained for the horizontal Y direction for non-square pixels. Stated differently, segment ds is mapped to a single pixel if dx is the size of the pixel, such as pixel 1501. Then, the geometry coordinates at distance z 1553 may be defined with precision in units of m, rather than full floating point accuracy, without causing any difference in visual quality.

For example, if screen space 1500 is of resolution 512× 512 pixels, the camera at camera location 1561 at the origin (0,0) facing −z direction, with near plane at (0,0, −1), and a triangle whose vertices have a distance of, for example, 256 from the camera, this camera space 1540 may be used by camera space logic 1407 and metric computation logic 1409 of metric mechanism 110 of FIG. 14 to measure what level of precision is needed to define the triangle vertex coordinates without visual differences, such as loss of visual quality, when the center of a pixel, such as pixel 1501, is sampled, such as $$m = \frac{R-L}{W} \cdot \left|\frac{z}{k}\right| = \frac{1-(-1)}{512} \cdot \left|\frac{256}{1}\right| = 1$$

Stated differently, differences less than 1 at a distance of 256 is indistinguishable at the pixel resolution when the sample is taken at the center of the pixel, such as pixel 1501. Therefore, a floating point value of 100.0 is mapped to the same pixel, such as pixel 1501, as any values within (100− 0.5,100+0.5), when z=256. In terms of quantization, for example, using a quantization scheme, if a point coordinate is (167.2395683, 221.2648923, 256), it may be quantized as: base: 167, quantized: (167−167,221−−167,256−167)=(0,54, 89), wherein each quantized number is represented as a 7-bit integer without losing any visual quality.

It is contemplated that embodiments are not limited to merely sampling at fixed positions within pixels; for example, in some embodiments, random samples may be used to reduce aliasing artifacts. Further, it is contemplated that quantization based on random samples may not be guaranteed to be lossless; nevertheless, random samples may be useful for quantifying the expected maximum error bound, assuming uniform sampling, such as when the samples are not at the center or fixed locations of pixels.

Referring now to FIG. 15B, it illustrates stratified sampling and metric error bound according to one embodiment. In computer graphics rendering, such as in case of ray tracing based approaches, multiple samples per pixel may be computed (e.g., using stratified sampling). These multiple sampling may be can be handled appropriately by scaling the sampling metric by 1/n, where n is number of samples per pixel, such as pixel 1501 of FIG. 15A:

$$M = \frac{m}{n}$$

Using stratified sampling, as shown in FIG. 15B, if m=1, two pixel rows 1571, 1581 are illustrated. For example, first pixel row 1571 shows as having one sample per pixel, such as n=1, so M=m/1=1, while in second pixel row 1581, two samples are taken, such as n=2, so M=m/2=½. For each end point, for example, the original value is assumed to be p, while the corresponding quantized value is Q(p)=q, where, for example, quantized values are M units apart (where Q(p) is a step function) and differs from the original value by at most M/2, then the error, e, is as follows:

$$e = |p - q| \leq \frac{M}{2}$$

This error is bounded by |±0.5| in the case of first pixel row 1571, and |±0.25| in the case of second pixel row 1581. Now, assuming the original values are uniformly distributed, the expected error is $$E(e) = \int_0^{\frac{M}{2}} \frac{|p-q|}{M/2} dp = \int_0^{\frac{M}{2}} \frac{M/2 - p}{M/2} dp = \frac{M}{4} = \frac{m}{4n}$$

Then, as the number of samples n increase, the expected error converges to 0:

$$\lim_{n \to \infty} E(e) = \lim_{n \to \infty} \frac{m}{4n} = 0$$

Then, the normalized error in screen space 1500 is $$e_{screen} = \frac{e}{m}$$

$$E(e_{screen}) = E\left(\frac{e}{m}\right) = \frac{1}{4n}$$

For example, when the sample count is large, the sampling metric may be simply limited to be of some acceptable value, such as m/4 k, where k≤n.

Stated differently, the application of a computed metric to the illustrated pixel rows 1571, 1581 may not be entirely lossless and the even though they are lossy, the loss is minimized to have minimal effect, if any, on the resulting visual quality. For example, as illustrated, in case of first pixel row 1571, in applying the computed metric of M=1, original object 1573 is reduced to quantized object 1575 with loss errors 1577A, 1577B. Similarly, for example, as illustrated, in case of second pixel row 1581, in applying the computed metric of M=½, original object 1583 is reduced to quantized object 1585 with loss errors 1587A, 1587B.

Figure 16:
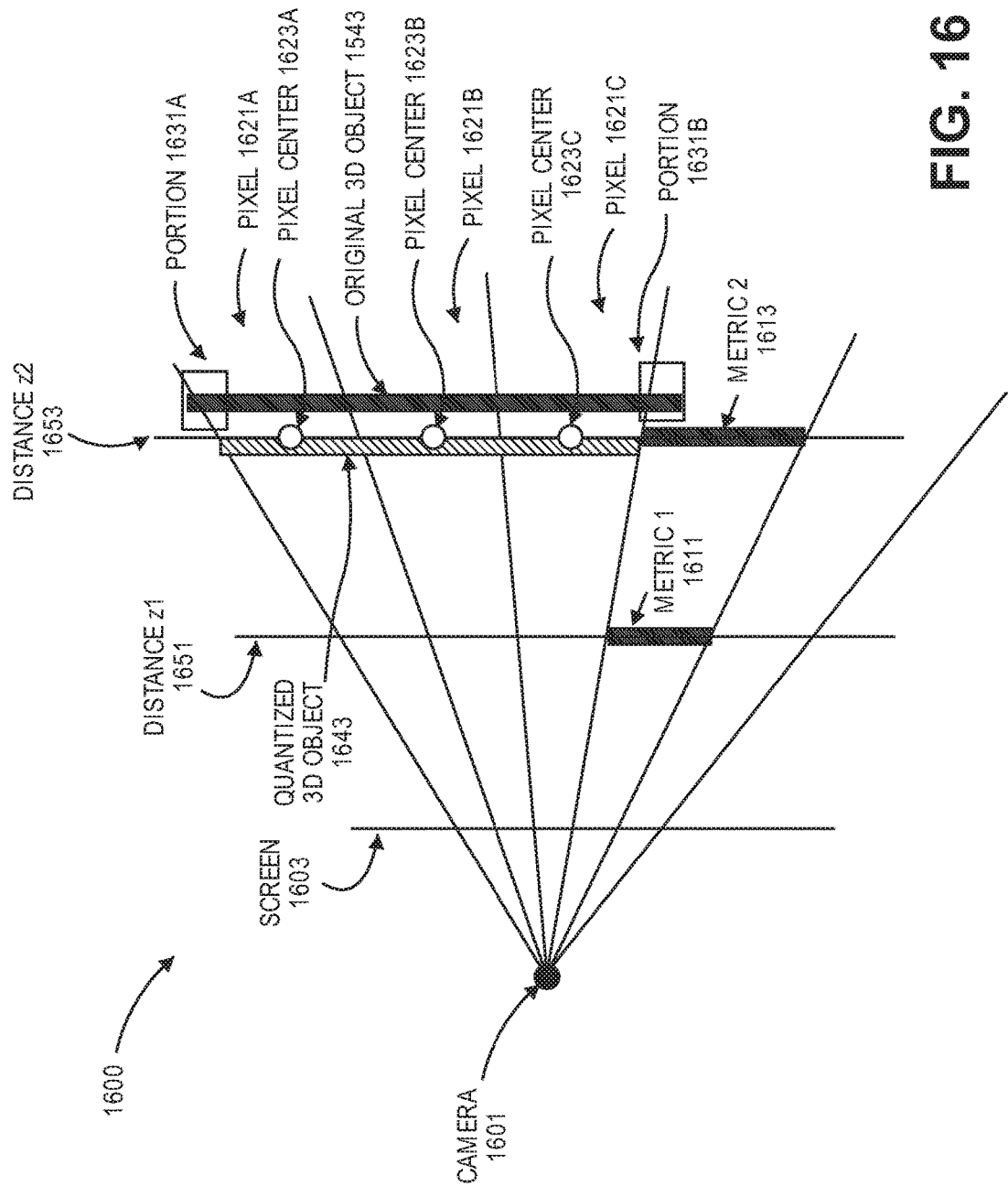
FIG. 16 illustrates an architectural placement for application of one or more metrics according to one embodiment.

FIG. 16 illustrates an architectural placement 1600 for application of one or more metrics 1611, 1613 according to one embodiment. In one embodiment, various processes of architectural placement 1600 may be performed by processing logic that may comprise hardware (e.g., circuitry, dedicated logic, programmable logic, etc.), software (such as instructions run on a processing device), or a combination thereof, as facilitated by metric mechanism 1310 of FIGS. 13-14. The processes of architectural placement 1600 are illustrated in linear sequences for brevity and clarity in presentation; however, it is contemplated that any number of them can be performed in parallel, asynchronously, or in different orders. For brevity, many of the details discussed with reference to the preceding FIGS. 1-15C may not be discussed or repeated hereafter.

Architectural placement 1600 is shown to include a number of pixels 1621A, 1621B, 1621C, where each pixel 1621A, 1621B, 1621C includes a center, such as pixel centers 1623A, 1623B, 1623C. In one embodiment, architectural placement 1600 further illustrates camera 1601, placed at origin (0,0), such that original 3D object 1543 is in view of camera 1601 and capable of being displayed in 2D format at screen 1603. It is contemplated that there may be other 3D objects at various distances, such as distance z1 1651, z2 1653, from camera 1601.

In one embodiment, as previously described with reference to FIG. 14, one or more metrics, such as metric 1 1611, metric 2 1613, may be used to quantize the corresponding original objects, such as metric 2 1613 may be applied to its corresponding original 3D object 1543 at distance z2 1653. For example, as illustrated, original 3D object 1543 spans over three pixels 1621A, 1621B, 1621C and expands beyond their pixel centers 1623A, 1623B, 1623C. In one embodiment, in applying metric 2 1613 to original 3D object 1643, it is determined that the extension of original 3D object 1643 is beyond the two "wing" pixel centers 1621A, 1621C, which may be unnecessary and thus those portions, shown as removed portions 1631A, 1631B, of original 3D object 1643 may be capable of being quantized without sacrificing any or too much of the visual quality.

For example, metric 2 1613 indicates the exact amount of original 3D object 1543 that may be removed while keeping the original 3D object 1543 and its expected visual quality intact. In one embodiment, this quantization may be entirely lossless, such as without any loss of visual quality, or, in another embodiment, the quantization may be lossy, such as with an insignificant and acceptable loss of visual quality. Further, in one embodiment, metrics 1 1611, 2 1613 may be adjustable based on the amount of visual quality that may be lost, where one or more metrics 1 1611, 2 1613 may be dynamically re-computed and adjusted so that the loss of visual quality may remain none or significantly small or irrelevant. In the illustrated, embodiment, based on metric 2 1613, portions 1631A, 1631B of original object 1543 are removed to intelligently compress original 3D object 1543 into quantized 3D object 1643 that may then be displayed to the user in a 2D format on screen 1603.

Figure 17A:
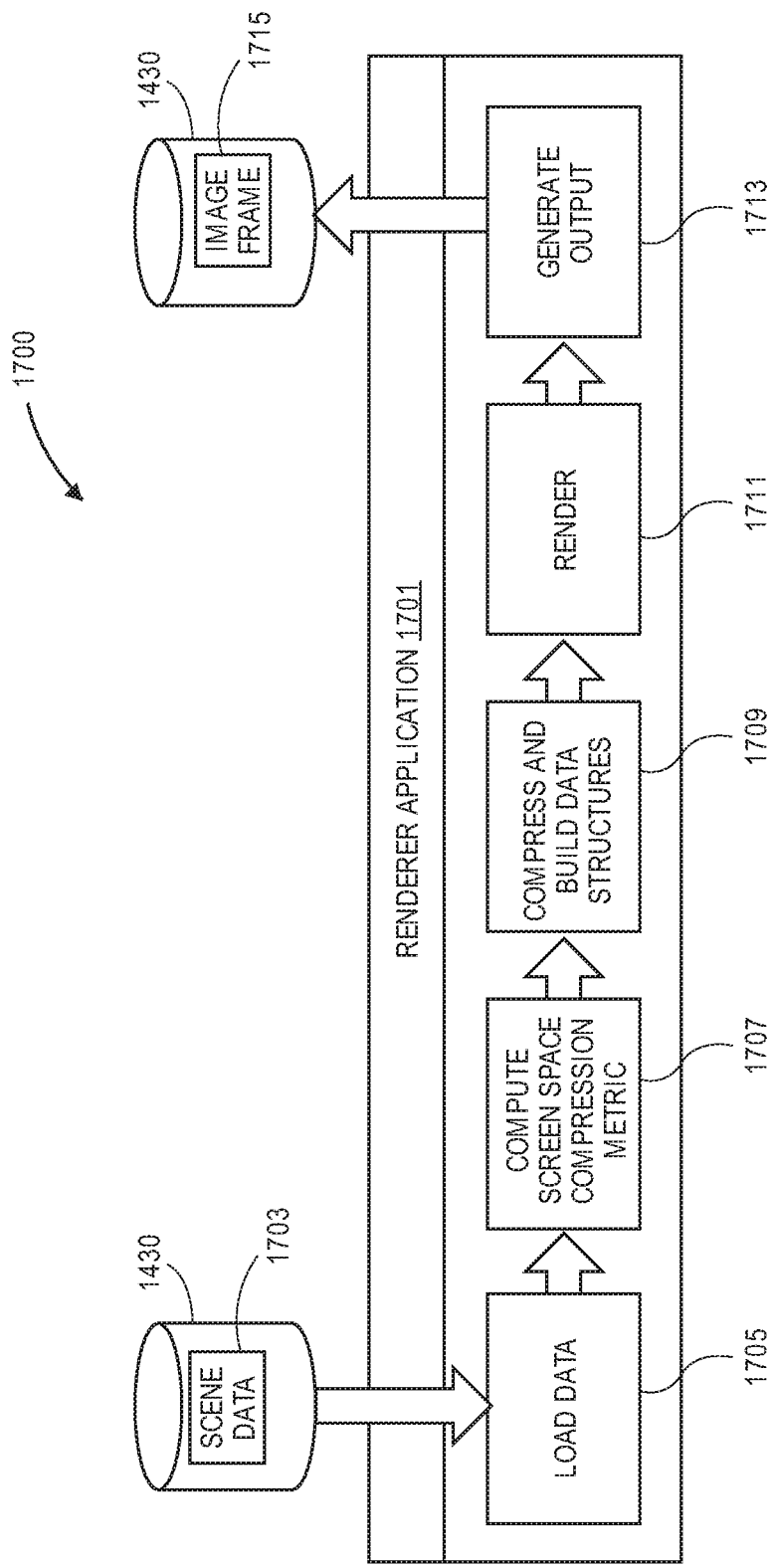
FIG. 17A illustrates a transaction sequence for facilitating computation and application of metrics for smart compression of data according to one embodiment.

FIG. 17A illustrates a transaction sequence 1700 for facilitating computation and application of metrics for smart compression of data according to one embodiment. Transactional sequence 1700 may be performed by processing logic that may comprise hardware (e.g., circuitry, dedicated logic, programmable logic, etc.), software (such as instructions run on a processing device), or a combination thereof, as facilitated by metric mechanism 1310 of FIGS. 14-15. The processes of transactional sequence 1700 are illustrated in linear sequences for brevity and clarity in presentation; however, it is contemplated that any number of them can be performed in parallel, asynchronously, or in different orders. For brevity, many of the details discussed with reference to the preceding FIGS. 1-16 may not be discussed or repeated hereafter.

Transaction sequence 1700 begins with accessing scene data 1703 at one or more data repositories, such as database(s) 1430 of FIG. 14, and loading of scene data 1703 with load data 1705 at renderer application 1701. In one embodiment, transaction sequence 1700 continues with computation of screen space compression metric at 1707, where this metric is used to compress and build data structures at 1709. The process continues with rendering of data at 1711 and generating of output at 1713 which is then transmitted over to one or more data repositories, such as database(s) 1430 of FIG. 14, as image frames at 1715.

Figure 17B:
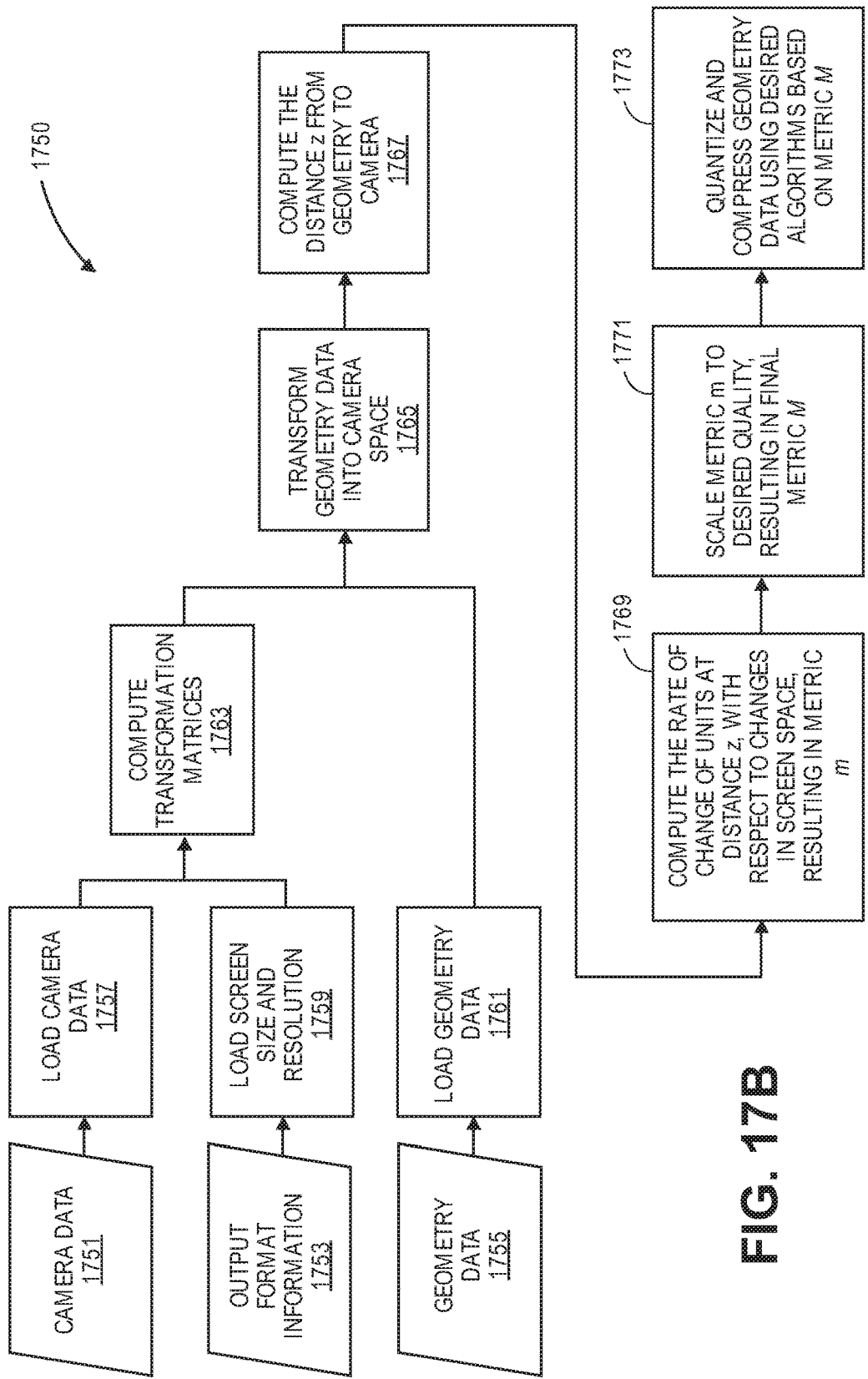
FIG. 17B illustrates a method for facilitating computation and application of metrics for smart compression of data according to one embodiment.

FIG. 17B illustrates a method 1750 for facilitating computation and application of metrics for smart compression of data according to one embodiment. Method 1750 may be performed by processing logic that may comprise hardware (e.g., circuitry, dedicated logic, programmable logic, etc.), software (such as instructions run on a processing device), or a combination thereof, as facilitated by metric mechanism 1310 of FIGS. 14-15. The processes of method 1750 are illustrated in linear sequences for brevity and clarity in presentation; however, it is contemplated that any number of them can be performed in parallel, asynchronously, or in different orders. For brevity, many of the details discussed with reference to the preceding FIGS. 1-17A may not be discussed or repeated hereafter.

Method 1750 begins with receiving of one or more sets of data, such as camera data at block 1751, output format information at block 1753, and geometry data at block 1755. At block 1757, camera data is loaded. At block 1759, screen size and resolution based on the output format information is loaded. At block 1761, geometry data is loaded. At block 1763, in one embodiment, transformation metrics are computed based on the camera data and the screen size and resolution data. In one embodiment, the computed transformation matrices are used in combination with the geometry data to transform geometry data into camera space at block 1765. At block 1767, in one embodiment, a distance, such as distance z, is computed from geometry to camera using the transformation of geometry data into camera space.

In one embodiment, at block 1769, a rate of change of units at the distance, such as distance z, is computed with respect to changes in screen space, which results in computation of an initial metric, m. At block 1771, in one embodiment, initial metric, m, is scaled to a desired visual quality (e.g., lossless or if lossy, how much loss, etc.), which results in computation of a final metric, M. At block 1773, in one embodiment, based on the final metric M, the relevant geometry data is then quantized and compressed using the desired quantization/compression algorithms.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate quantization and compression of three-dimensional graphics data using screen space metrics at computing devices, comprising: detection/reception logic to detect one or more sets of data comprising at least one of camera data, output format data, and geometry data; evaluation and generation logic to obtain geometry of a three-dimensional (3D) original object based on the geometry data; camera space logic to compute, in camera space, visual quality of the 3D original object when moved closer to or farther away from a camera based on at least one of the camera data and the output format data; metric computation logic to compute a metric based on the visual quality; and execution and compression logic to compress the 3D original object into a 3D quantized object based on the metric.

Example 2 includes the subject matter of Example 1, wherein the evaluation and generation logic is further to evaluate the geometry to compute transformation data, wherein the evaluation and generation logic is further to generate a canonical view space from screen space based on the transformation data, wherein the screen space represents a two-dimensional (2D) representation of the geometry of the 3D original object.

Example 3 includes the subject matter of Example 1 or 2, wherein the evaluation and generation logic is further to generate, via the transformation data, the camera space based on the canonical view space, wherein the camera space is populated based on the camera data.

Example 4 includes the subject matter of Example 1, wherein the metric computation logic is further to dynamically adjust the metric corresponding to one or more changes in the visual quality.

Example 5 includes the subject matter of Example 4, wherein dynamically adjusting comprises scaling the metric to correspond to an accepted change of the one or more changes in the visual quality, wherein the metric continues to be adjusted while corresponding to one or more rejected changes of the one or more changes in the visual quality.

Example 6 includes the subject matter of Example 4 or 5, wherein the visual quality is computed based on the 2D representation of the 3D original object in the screen space, wherein the accepted change includes at least one of a lossless visual quality and a lossy visual quality, wherein one or more rejected changes indicate one or more losses in the visual quality that are greater than a loss in the lossy visual quality.

Example 7 includes the subject matter of Example 1, wherein the execution and compression logic is further to quantize one or more portions of the 3D original object to generate the 3D quantized object, wherein one or more portions are determined based on the metric.

Example 8 includes the subject matter of Example 1, further comprising communication/compatibility logic to facilitate one or more of storing, sharing, and displaying of the 3D quantized object without the one or more portions, wherein displaying is performed, via a display device, in a 2D format without the one or more portions.

Some embodiments pertain to Example 9 that includes a method for facilitating quantization and compression of three-dimensional graphics data using screen space metrics at computing devices, comprising: detecting one or more sets of data comprising at least one of camera data, output format data, and geometry data; obtaining geometry of a three-dimensional (3D) original object based on the geometry data; computing, in camera space, visual quality of the 3D original object when moved closer to or farther away from a camera based on at least one of the camera data and the output format data; computing a metric based on the visual quality; and compressing the 3D original object into a 3D quantized object based on the metric.

Example 10 includes the subject matter of Example 9, further comprising evaluating the geometry to compute transformation data, wherein evaluating further comprises generating a canonical view space from screen space based on the transformation data, wherein the screen space represents a two-dimensional (2D) representation of the geometry of the 3D original object.

Example 11 includes the subject matter of Example 9 or 10, wherein evaluating further comprises generating, via the transformation data, the camera space based on the canonical view space, wherein the camera space is populated based on the camera data.

Example 12 includes the subject matter of Example 9, wherein computing the metric further comprises dynamically adjusting the metric corresponding to one or more changes in the visual quality.

Example 13 includes the subject matter of Example 12, wherein dynamically adjusting comprises scaling the metric to correspond to an accepted change of the one or more changes in the visual quality, wherein the metric continues to be adjusted while corresponding to one or more rejected changes of the one or more changes in the visual quality.

Example 14 includes the subject matter of Example 12 or 13, wherein the visual quality is computed based on the 2D representation of the 3D original object in the screen space, wherein the accepted change includes at least one of a lossless visual quality and a lossy visual quality, wherein one or more rejected changes indicate one or more losses in the visual quality that are greater than a loss in the lossy visual quality.

Example 15 includes the subject matter of Example 9, wherein compressing comprises quantizing one or more portions of the 3D original object to generate the 3D quantized object, wherein one or more portions are determined based on the metric.

Example 16 includes the subject matter of Example 9, further comprising facilitating one or more of storing, sharing, and displaying of the 3D quantized object without the one or more portions, wherein displaying is performed, via a display device, in a 2D format without the one or more portions.

Some embodiments pertain to Example 17 includes a system comprising a storage device having instructions, and a processor to execute the instructions to facilitate a mechanism to perform one or more operations comprising: detecting one or more sets of data comprising at least one of camera data, output format data, and geometry data; obtaining geometry of a three-dimensional (3D) original object based on the geometry data; computing, in camera space, visual quality of the 3D original object when moved closer to or farther away from a camera based on at least one of the camera data and the output format data; computing a metric based on the visual quality; and compressing the 3D original object into a 3D quantized object based on the metric.

Example 18 includes the subject matter of Example 17, wherein the one or more operations further comprise evaluating the geometry to compute transformation data, wherein evaluating further comprises generating a canonical view space from screen space based on the transformation data, wherein the screen space represents a two-dimensional (2D) representation of the geometry of the 3D original object.

Example 19 includes the subject matter of Example 17 or 18, wherein evaluating further comprises generating, via the transformation data, the camera space based on the canonical view space, wherein the camera space is populated based on the camera data.

Example 20 includes the subject matter of Example 17, wherein computing the metric further comprises dynamically adjusting the metric corresponding to one or more changes in the visual quality.

Example 21 includes the subject matter of Example 20, wherein dynamically adjusting comprises scaling the metric to correspond to an accepted change of the one or more changes in the visual quality, wherein the metric continues to be adjusted while corresponding to one or more rejected changes of the one or more changes in the visual quality.

Example 22 includes the subject matter of Example 17 or 21, wherein the visual quality is computed based on the 2D representation of the 3D original object in the screen space, wherein the accepted change includes at least one of a lossless visual quality and a lossy visual quality, wherein one or more rejected changes indicate one or more losses in the visual quality that are greater than a loss in the lossy visual quality.

Example 23 includes the subject matter of Example 17, wherein compressing comprises quantizing one or more portions of the 3D original object to generate the 3D quantized object, wherein one or more portions are determined based on the metric.

Example 24 includes the subject matter of Example 17, wherein the one or more operations further comprise facilitating one or more of storing, sharing, and displaying of the 3D quantized object without the one or more portions, wherein displaying is performed, via a display device, in a 2D format without the one or more portions.

Some embodiments pertain to Example 25 includes an apparatus comprising: means for detecting one or more sets of data comprising at least one of camera data, output format data, and geometry data; means for obtaining geometry of a three-dimensional (3D) original object based on the geometry data; means for computing, in camera space, visual quality of the 3D original object when moved closer to or farther away from a camera based on at least one of the camera data and the output format data; means for computing a metric based on the visual quality; and means for compressing the 3D original object into a 3D quantized object based on the metric.

Example 26 includes the subject matter of Example 25, further comprising means for evaluating the geometry to compute transformation data, wherein the means for evaluating further comprises means for generating a canonical view space from screen space based on the transformation data, wherein the screen space represents a two-dimensional (2D) representation of the geometry of the 3D original object.

Example 27 includes the subject matter of Example 25 or 26, wherein the means for evaluating further comprises means for generating, via the transformation data, the camera space based on the canonical view space, wherein the camera space is populated based on the camera data.

Example 28 includes the subject matter of Example 25, wherein the means for computing the metric further comprises means for dynamically adjusting the metric corresponding to one or more changes in the visual quality.

Example 29 includes the subject matter of Example 28, wherein the means for dynamically adjusting further comprises means for scaling the metric to correspond to an accepted change of the one or more changes in the visual quality, wherein the metric continues to be adjusted while corresponding to one or more rejected changes of the one or more changes in the visual quality.

Example 30 includes the subject matter of Example 25 or 29, wherein the visual quality is computed based on the 2D representation of the 3D original object in the screen space, wherein the accepted change includes at least one of a lossless visual quality and a lossy visual quality, wherein one or more rejected changes indicate one or more losses in the visual quality that are greater than a loss in the lossy visual quality.

Example 31 includes the subject matter of Example 25, wherein the means for compressing comprises means for quantizing one or more portions of the 3D original object to generate the 3D quantized object, wherein one or more portions are determined based on the metric.

Example 32 includes the subject matter of Example 25, further comprising means for facilitating one or more of storing, sharing, and displaying of the 3D quantized object without the one or more portions, wherein displaying is performed, via a display device, in a 2D format without the one or more portions.

Example 33 includes at least one non-transitory or tangible machine-readable medium comprising a plurality of instructions, when executed on a computing device, to implement or perform a method as claimed in any of claims or examples 9-16.

Example 34 includes at least one machine-readable medium comprising a plurality of instructions, when executed on a computing device, to implement or perform a method as claimed in any of claims or examples 9-16.

Example 35 includes a system comprising a mechanism to implement or perform a method as claimed in any of claims or examples 9-16.

Example 36 includes an apparatus comprising means for performing a method as claimed in any of claims or examples 9-16.

Example 37 includes a computing device arranged to implement or perform a method as claimed in any of claims or examples 9-16.

Example 38 includes a communications device arranged to implement or perform a method as claimed in any of claims or examples 9-16.

Example 39 includes at least one machine-readable medium comprising a plurality of instructions, when executed on a computing device, to implement or perform a method or realize an apparatus as claimed in any preceding claims.

Example 40 includes at least one non-transitory or tangible machine-readable medium comprising a plurality of instructions, when executed on a computing device, to implement or perform a method or realize an apparatus as claimed in any preceding claims.

Example 41 includes a system comprising a mechanism to implement or perform a method or realize an apparatus as claimed in any preceding claims.

Example 42 includes an apparatus comprising means to perform a method as claimed in any preceding claims.

Example 43 includes a computing device arranged to implement or perform a method or realize an apparatus as claimed in any preceding claims.

Example 44 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A computing device comprising:
a memory to store a metric application; and
a graphics processor coupled to the memory and to execute the metric application in computing a rate of change of a geometry size of an object at a plurality of distances in screen space with respect to a location of a camera at an origin as a computed metric used to compress geometry data of the object.

2. The computing device of claim 1, wherein the graphics processor is to compute the geometry size of the object at each of the plurality of distances in screen spaces with respect to the location of the camera at the origin.

3. The computing device of claim 1, wherein the computed metric provides a level of precision needed to define the object.

4. The computing device of claim 1, wherein the graphics processor scales the computed metric.

5. The computing device of claim 4, wherein the graphics processor is to quantize the object using the scaled computed metric.

6. The computing device of claim 5, wherein the quantization of the object is lossless or with some loss.

7. A method comprising:
receiving object data for an object in screen space;
computing, using the object data, a rate of change of a geometry size of the object in screen space with respect to a location of a camera location at an origin as a computed metric; and
compressing geometry data of the object using the computed metric.

8. The method of claim 7, wherein computing the rate of change includes computing the geometry size of the object at each of the plurality of distances in screen space with respect to the location of the camera at the origin.

9. The method of claim 7, further comprising providing a level of precision needed to define the object using the computed metric.

10. The method of claim 7, further comprising scaling the computed metric.

11. The method of claim 10, further comprising quantizing the object using the scaled computed metric.

12. The method of claim 11, wherein quantizing the object is lossless or with some loss.

13. A non-transitory computer-readable medium having instructions, which upon execution by a processor, causes the processor to perform a method comprising:
receiving object data for an object in screen space;
computing, using the object data, a rate of change of a geometry size of the object data in screen space with respect to a location of a camera location at an origin as a computed metric; and
compressing geometry data of the object using the computed metric.

14. The non-transitory computer-readable medium of claim 13, further causing the processor to perform a method comprising computing the rate of change includes computing the geometry size of the object at each of the plurality of distances in screen space with respect to the location of the camera at the origin.

15. The non-transitory computer-readable medium of claim 13, further causing the processor to perform a method comprising scaling the computed metric.

16. The non-transitory computer-readable medium of claim 15, further causing the processor to perform a method comprising quantizing the object using the scaled computed metric.

17. The non-transitory computer-readable medium of claim 13, further causing the processor to perform a method comprising providing a level of precision needed to define the object using the computed metric.

18. The non-transitory computer-readable medium of claim 13, further causing the processor to perform a method comprising quantizing the object using the scaled computed metric in a lossless or with some loss manner.

19. A system comprising:
a processing core having screen space data related to at least one object;
a I/O hub controller coupled to the processing core and to provide data storage, network, and processing core access; and
a graphics processor coupled to the I/O hub controller and to computing a rate of change of a geometry size of the at least one object at a plurality of distances in screen space with respect to a location of a camera at an origin as a computed metric used to compress geometry data of the at least one object.

20. The system of claim 19, wherein the graphics processor is to computed the geometry size of the at least one object at each of the plurality of distances in screen space with respect to the location of the camera at the origin.

21. The system of claim 19, wherein the graphics processor is to provide a level of precision needed to define the at least one object based on the computed metric.

22. The system of claim 19, wherein the graphics processor scales the computed metric.

23. The system of claim 19, wherein the graphics processor is to quantize the at least one object using the scaled computed metric.

24. The system of claim 22, wherein the quantization of the at least one object is lossless or with some loss.

* * * * *